United States Patent [19]

Iwasaki et al.

[11] Patent Number: 5,687,407
[45] Date of Patent: Nov. 11, 1997

[54] EXPOSURE CALCULATION DEVICE FOR CAMERA

[75] Inventors: Hiroyuki Iwasaki, Tokyo; Tadao Takagi, Yokohama, both of Japan

[73] Assignee: Nikon Corporation, Tokyo, Japan

[21] Appl. No.: 702,857

[22] Filed: Aug. 26, 1996

Related U.S. Application Data

[63] Continuation of Ser. No. 445,792, May 22, 1995, abandoned, which is a continuation of Ser. No. 309,970, Sep. 20, 1994, abandoned, which is a continuation of Ser. No. 813,525, Dec. 26, 1991, abandoned.

[30] Foreign Application Priority Data

Jan. 8, 1991 [JP] Japan ................................ 3-018218
Apr. 12, 1991 [JP] Japan ................................ 3-108751

[51] Int. Cl.$^6$ ................................................ G03B 7/00
[52] U.S. Cl. ................................................ 396/225; 376/49
[58] Field of Search ................................ 396/49, 225

[56] References Cited

U.S. PATENT DOCUMENTS 4,751,542  6/1988  Cibils Madero ............... 354/430
4,847,680  7/1989  Okino ............................. 354/430
4,887,121  12/1989  Pritchard ........................ 354/430

FOREIGN PATENT DOCUMENTS 63-256934  10/1988  Japan .
2-253124   10/1990  Japan .

*Primary Examiner*—Russell E. Adams

[57] ABSTRACT

An exposure calculation device for use in a camera, is provided with a light metering device for effecting light metering in each of plural areas divided in the object field and generating a light metering signal, containing information relating to the color of the object in each area. A first judgment device judges, whether the object in each area is colored or uncolored, based on the light metering signal and determining colored areas in which the object is colored and uncolored areas in which the object is uncolored; A second judgment device judges whether a predetermined uncolored area contains a white or black object, based on the light metering signals from the colored areas and those from the uncolored areas; An exposure value determining device determines the exposure value according to the light metering signals, based on the results of judgment by the first and second judgment devices.

14 Claims, 22 Drawing Sheets

EXPOSURE CALCULATION DEVICE FOR CAMERA

This application is a continuation of application Ser. No. 08/445,792, filed May 22, 1995, now abandoned, which is a continuation of application Ser. No. 08/309,970, filed Sep. 20, 1994, abandoned, which is a continuation of application Ser. No. 07/813,525, filed Dec. 26, 1991, abandoned.

BACKGROUND OF THE INVENTION

1. Field of the Invention

The present invention relates to an exposure calculation device for use in a camera, for providing appropriate exposure to a black or white object.

2. Related Background Art

The exposure calculation in the conventional automatic exposure cameras is generally based on an assumption that the reflectance of the objects is approximately constant. More specifically, such exposure calculation is based on an assumed reflectance of about 18%, which is a geometrical average of the highest reflectance of 90% and the lowest reflectance of 3% observed in usual objects. For this reason, the conventional cameras have been associated with a drawback that a white or black object is reproduced as gray.

In order to overcome such drawback, the Japanese Patent Laid-open Application No. 63-256934, for example, discloses a device which includes a light emitter for projecting light toward the object and a photosensor for receiving the light reflected from said object, and in which the reflected light intensity is detected from the output of said photosensor, then the reflectance of the object is evaluated from said reflected light intensity and the distance of said object, and the exposure value is calculated according to the result of said evaluation. Thus, if the reflectance of the object is high, said object is identified as white and there is selected an exposure value giving an over-exposure compared to the normal state, while, if the reflectance of the object is low, said object is identified as black and there is selected an exposure value giving an under-exposure compared to the normal state. Consequently a black object can be reproduced as black, and a white object can be reproduced as white.

However, when the object is distant as in a landscape photograph, the light from said light emitter is not reflected and not received by the photosensor, so that the reflectance of the object cannot be determined. Thus, the above-explained camera is incapable of identifying whether the object is black or white if said object is distant, so that a black or white object may be reproduced as gray.

Also there is already known a light metering device for a camera, capable of correcting the exposure value, based on the result of measurement of color of the object, for example as disclosed in the Japanese Patent Laid-open Application No. 2-253124.

Such device measures the color of the object, estimates the reflectance of said object from said color through fuzzy estimation, and corrects the exposure value, based on thus estimated reflectance.

However such device, not correcting the exposure value for an uncolored object for which such correction is most strongly desirable, does not resolve the conventional drawback that a whitish object tends to be under-exposed in the ordinary phototaking operation.

SUMMARY OF THE INVENTION

An object of the present invention is to provide an exposure calculating device for a camera, capable of reproducing a black object as-black and a white object as white, regardless of the distance of such object.

Another object of the present invention is to provide a light metering device for use in a camera, capable of judging the whiteness of the object, and accordingly correcting the light metered value thereby providing an appropriate exposure value.

DESCRIPTION OF THE PREFERRED EMBODIMENTS

In the following there will be explained a first embodiment of the present invention, with reference to FIGS. 1 to 11.

Figure 1:
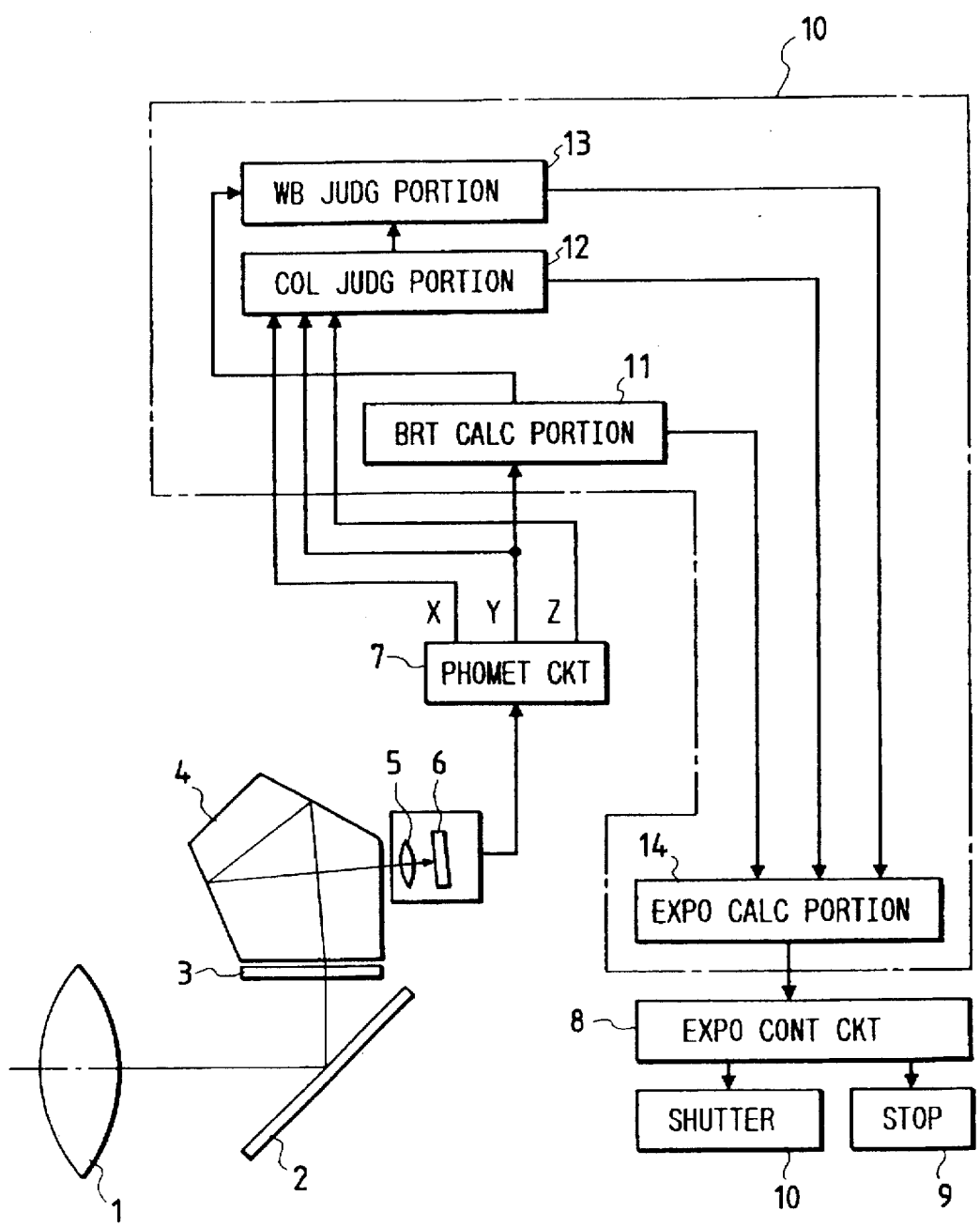
FIG. 1 is a block diagram of an exposure calculation device for use in a camera, constituting a first embodiment of the present invention.

FIG. 1 is a block diagram of the entire structure of an exposure calculation device, for use in a camera, of the present invention.

An object light, introduced into a camera body through a phototaking lens 1, is reflected upwards by a main mirror 2, then guided through a focus screen 3 and a pentagonal prism 4, constituting a viewfinder optical system, and is partly observed through an unrepresented eyepiece lens. The remaining part is guided through a light-metering lens 5 and received by a photosensor 6. The output signal of said photosensor 6 is supplied to a light metering circuit 7 which in response generates three light metering signals X, Y, Z to be explained later.

A control circuit 10 is composed of a brightness calculation unit 11, for calculating the object 5rightness from the light metering signal Y obtained from said light metering circuit 7; a color judging unit 12 for judging whether the object is colored or uncolored, based on the light metering signals X, Y, Z; a white-black judging unit 13 for identifying a black or white object among those identified as colorless; and an exposure calculation unit 14 for calculating the exposure value, based on the outputs of the brightness calculation unit 11 and two judging units 12, 13. An exposure control circuit 8 is for effecting a phototaking operation by driving a diaphragm 9 and a shutter 10 according to the exposure value calculated by the exposure calculation unit 14.

Figure 2:
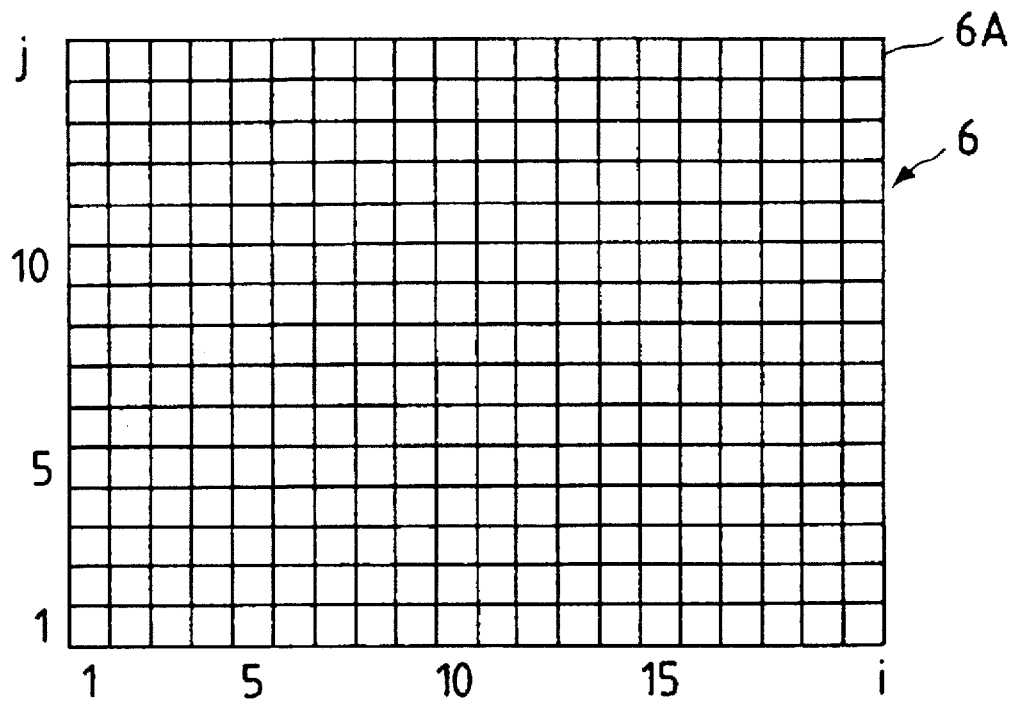
FIG. 2 is a view showing the structure of a photosensor.
Figure 3:
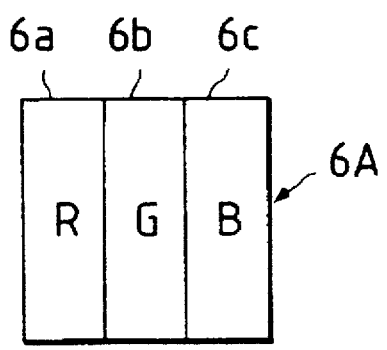
FIG. 3 is a view showing the structure of a divided light-metering element constituting said photosensor.
Figure 4:
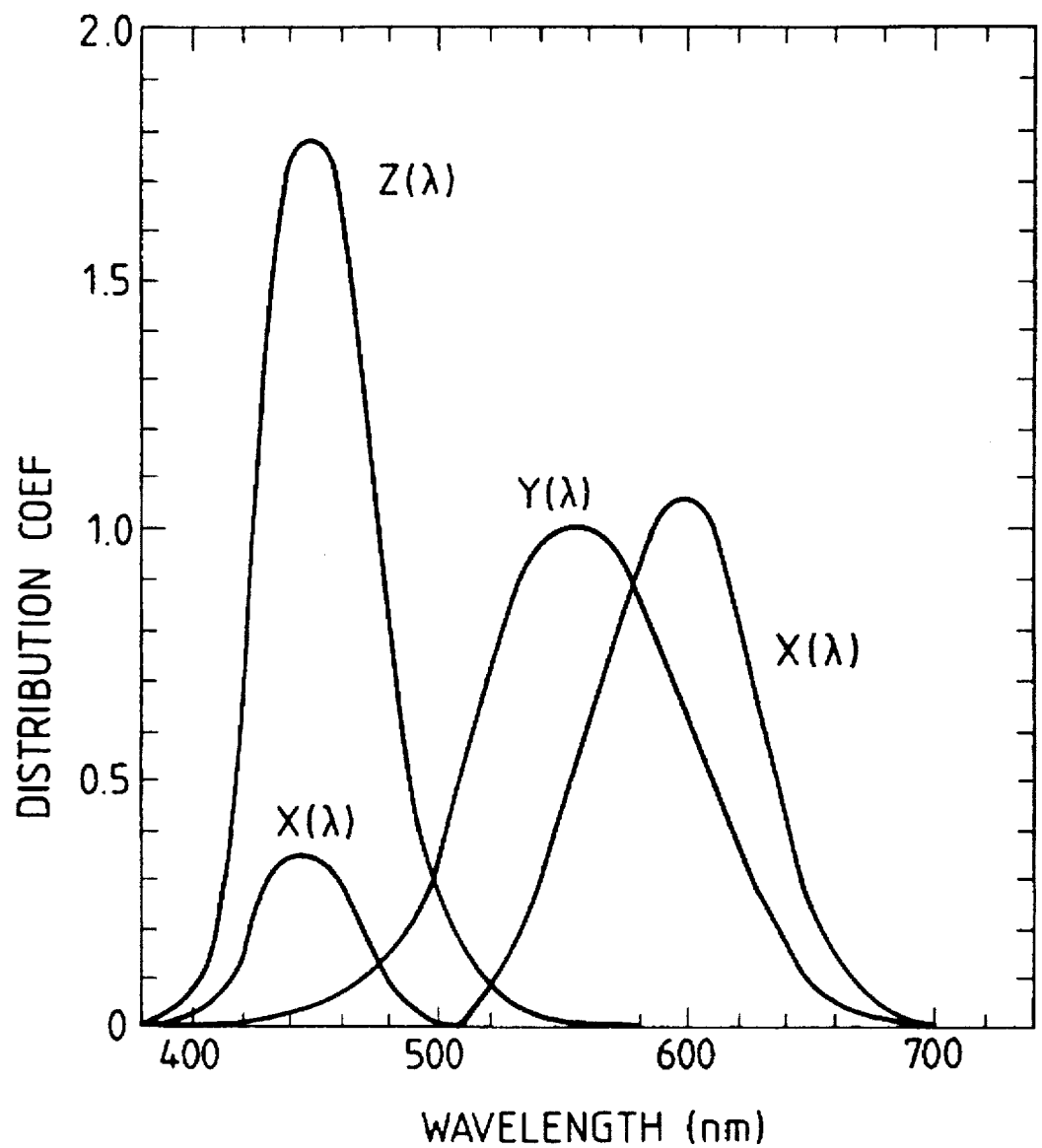
FIG. 4 is a chart of three spectral sensitivities of each divided light-metering element.

FIG. 2 is a magnified view of the above-mentioned photosensor 6, which is divided into 247 elements 6A arranged in a matrix of 13×19 respectively in the vertical and horizontal directions. Said elements respectively correspond to 247 areas similarly divided in the object field. As shown in FIG. 3, each element 6A is further divided into areas 6a, 6b and 6c which are respectively fitted with filters of spectral characteristics $x(\lambda)$, $y(\lambda)$, $z(\lambda)$ as shown in FIG. 4, which are generally called spectral stimuli and represent the spectral sensitivity characteristics of three visual cells of the human eye. The curves $x(\lambda)$, $y(\lambda)$ and $z(\lambda)$ respectively represent sensitivity to red (R), green (G) and blue-purple (B). The divided elements 6a, 6b, 6c equipped with such filters send output signals to a light-metering circuit 7, which in response generates light-metering signals X, Y, Z corresponding to said outputs.

Figure 5:
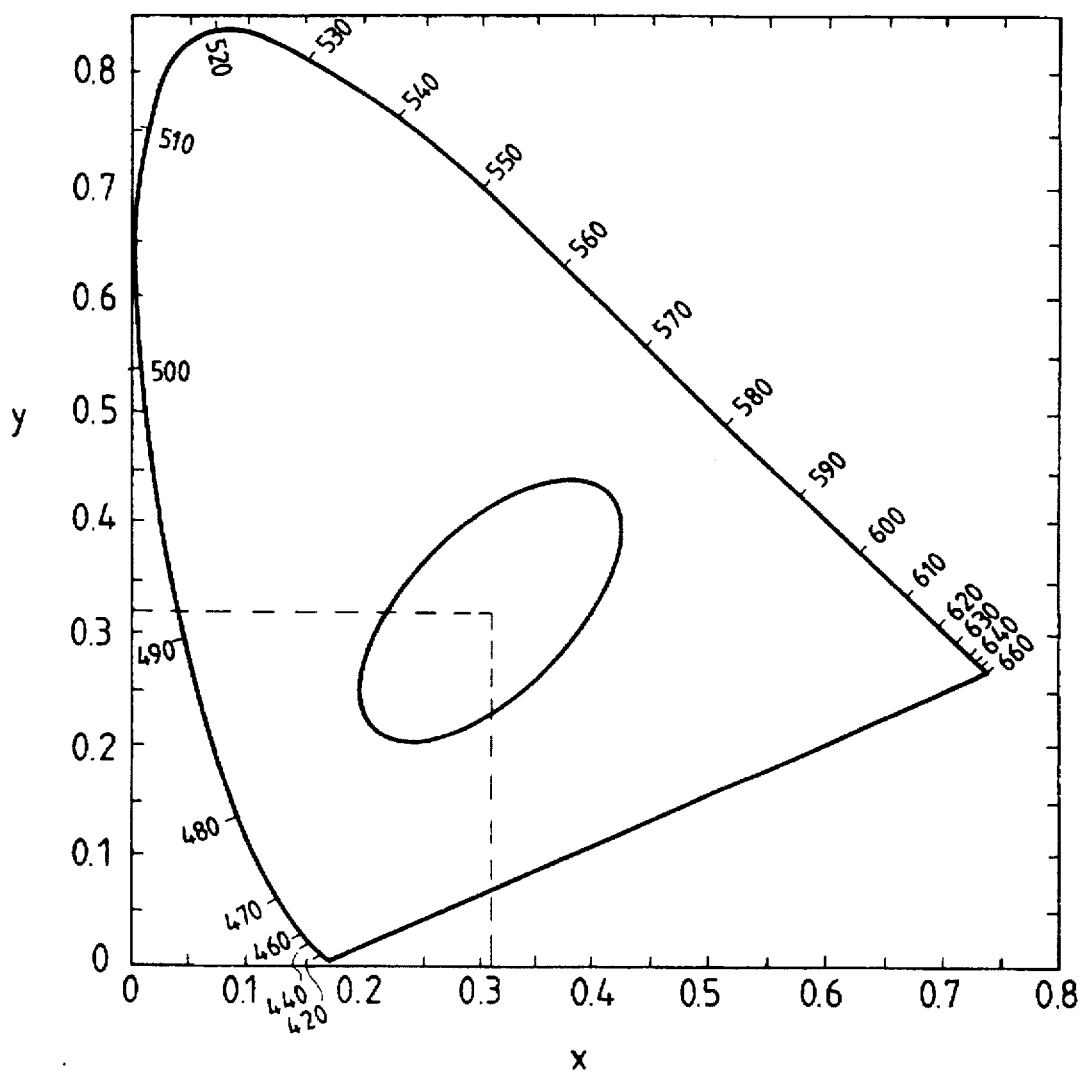
FIG. 5 is an x-y color chart.

FIG. 5 is a well-known x-y color chart, and a color can be identified by plotting, on said chart, (x, y) defined by:

$$x=X/(X+Y+Z), y=Y/(X+Y+Z)$$

wherein X, Y, Z are the above-mentioned light-metering signals. An oval curve shown in FIG. 5 is defined by an equation:

$$(y-x)^2+(x-0.31)^2=0.11^2$$

with the center at (x, y)=(0.31, 0.32). This coordinate (0.31, 0.32) corresponds to the uncolored axis for the surface color of an object illuminated by the standard light C. Thus, if (x, y) obtained from the output of an element 6A is (0.31, 0.32), the object in a divided area corresponding to said element 6A is completely colorless. In the present embodiment, the object is regarded as colored or uncolored (white-black) respectively when the coordinate (x, y) is within said oval curve or outside said oval curve.

The equation for the oval curve is not limited to the one shown above. Also the above-mentioned element 6A is divided into the areas 6a, 6b and 6c from left to right as shown in FIG. 3, so that these areas do not measure a same object area in a strict sense. However, since the light-metering elements are divided very finely, the areas 6a, 6b, 6c only have a very little positional aberration and may be regarded to measure a same position.

In the following is explained the control sequence of the control circuit 10, with reference to flow charts shown in FIGS. 6 to 11.

Figure 6:
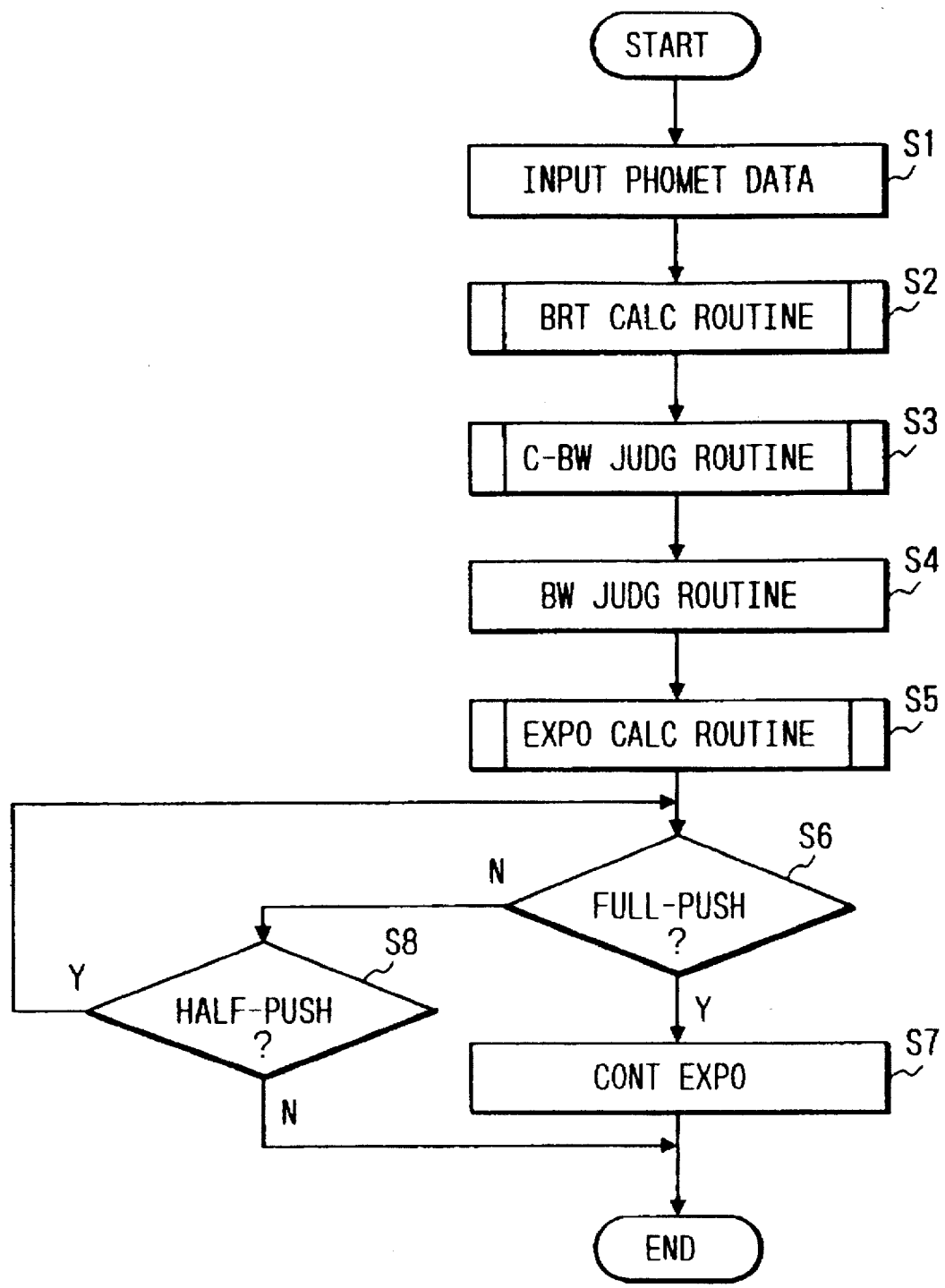
FIG. 6 is a main flow chart of the control sequence of said embodiment.

FIG. 6 shows a main program, which is activated when an unrepresented shutter release button is half pushed. A first step S1 fetches the light metering signals X, Y, Z from the light-metering circuit 7, based on the detection outputs of the 247 elements 6A. Then a step S2 calculates the brightness in each of the areas of the object field, based on Y, among the entered light-metering signals X, Y and Z. The details of said brightness calculation are shown in a subroutine in FIG. 7, to be executed by said brightness calculation unit 11.

Figure 7:
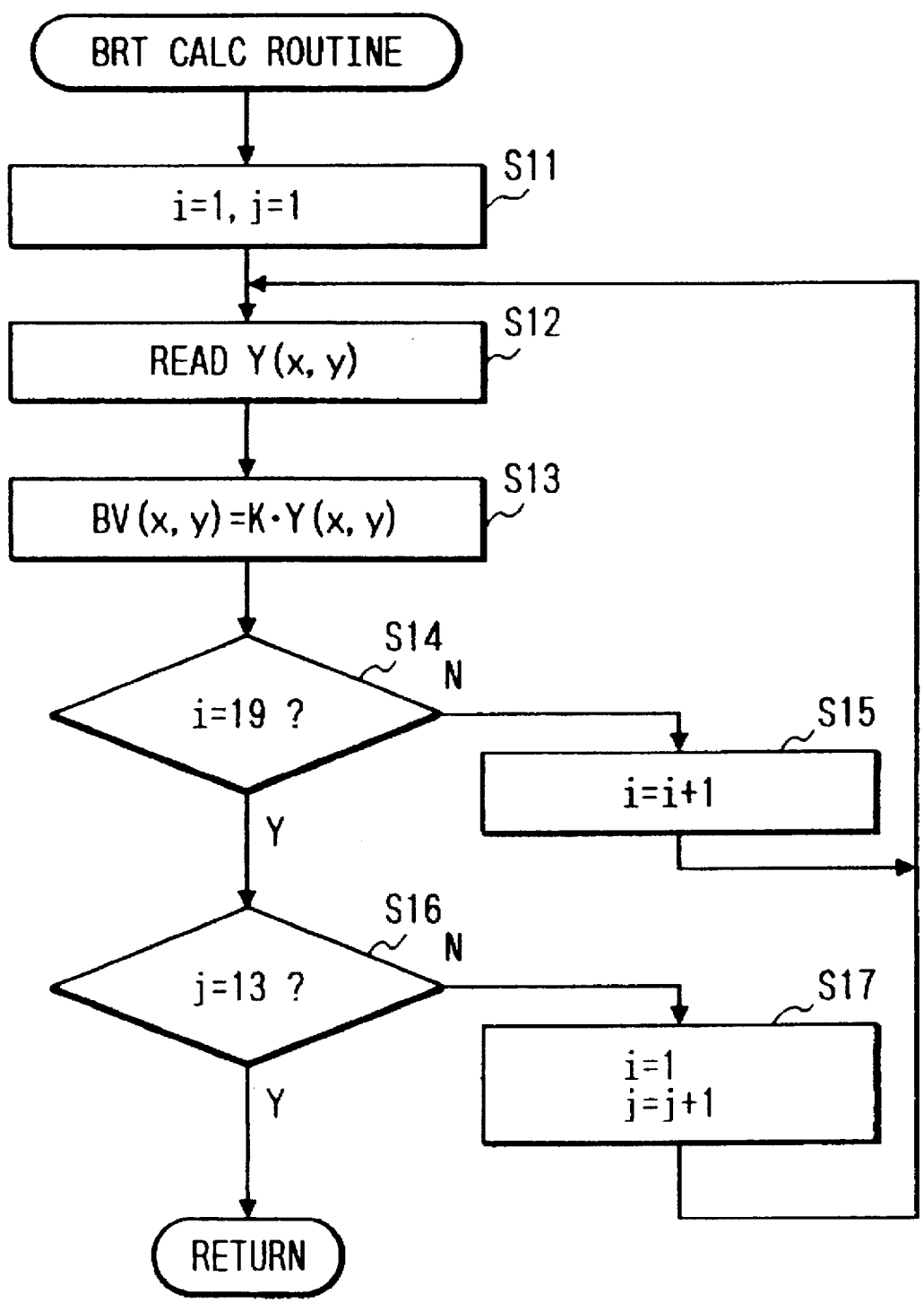
FIG. 7 is a flow chart of a subroutine for brightness calculation.

Referring to FIG. 7, a step S11 sets variables i, j at "1", and a step S12 reads the light metering signal Y(i, j), wherein i is the horizontal address of the photosensor elements 6A shown in FIG. 6, numbered from 1 to 19 from left to right, while j is the vertical address of said photosensor elements, numbered from 1 to 13 from bottom to top. Thus, the light metering signal corresponding to the element 6A at the lower left corner is Y(1, 1), while that corresponding to the element 6A at the upper right corner is Y(19, 13).

Then a step S13 multiplies the light metering signal Y(i, j) by a predetermined proportion constant K to determined the brightness value BV(i, j). The above-mentioned sensitivity characteristic $y(\lambda)$ is identical with the standard relative visual sensitivity $V(\lambda)$ in photometry, so that the brightness can be obtained by multiplying said light-metering signal Y with a constant.

Said brightness calculation is conducted for the divided elements 6A of a row by stepwise increments of i in a step S15, until i=19 is identified in a step S14, and is then conducted for the elements 6A of the next row, by resetting i to "1" and stepwise increasing the value of j. The sequence returns to the flow shown in FIG. 6, when a step S16 identifies j=13, indicating that the brightness value has been calculated for all the 247 divided elements 6A.

Figure 8:
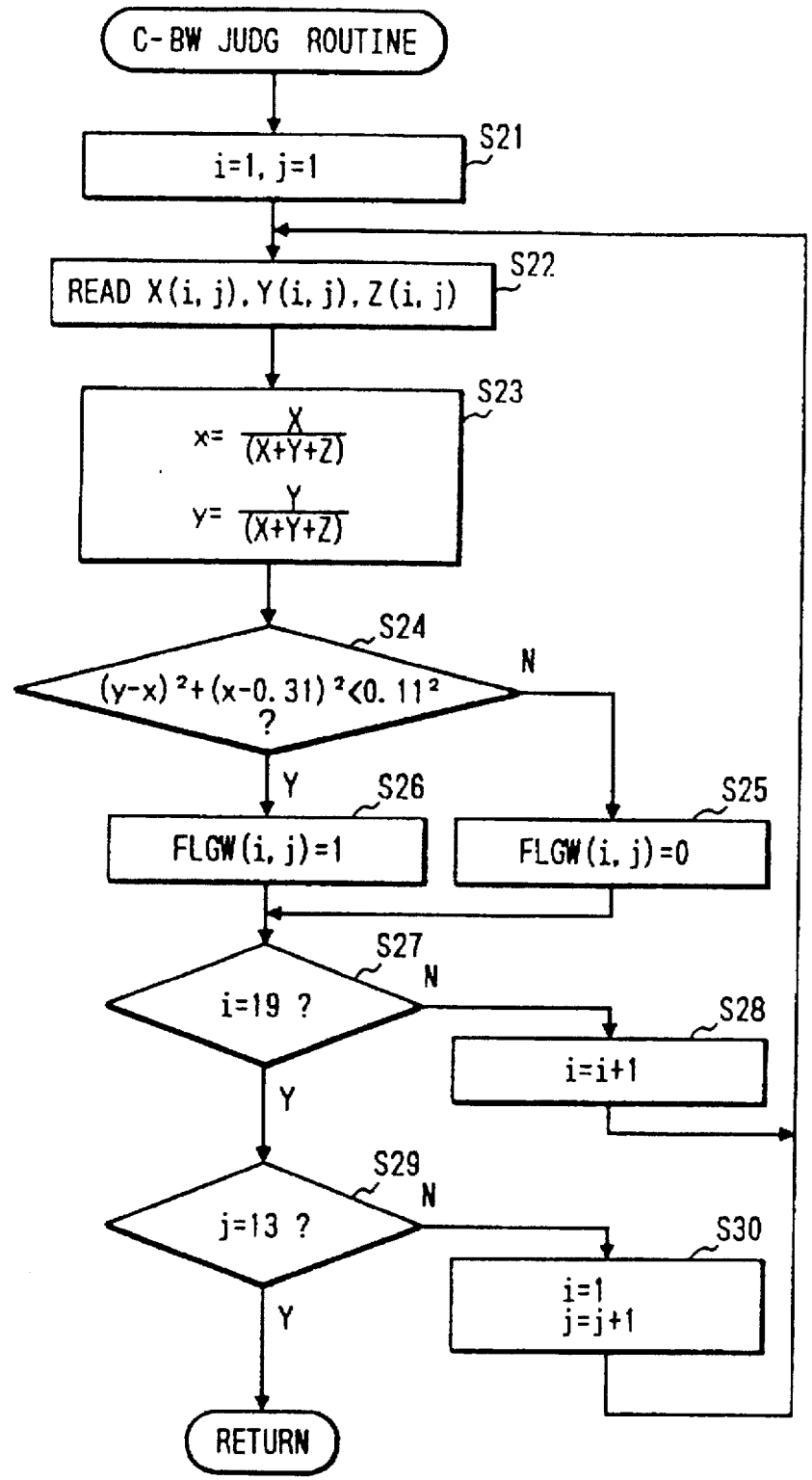
FIG. 8 is a flow chart of a subroutine for color judgment.

A step S3 in FIG. 6 executes a color judgment subroutine, shown in FIG. 8, to be executed by the color judgment unit 12.

Referring to FIG. 8, a step S21 sets variables i, j at "1", and steps S22 to S30 execute a judgment as to whether each area corresponding to the elements 6A is colored or uncolored. More specifically, a step S22 reads the light metering signals X(i, j), Y(i, j) and Z(i, j) from the light metering circuit 7, and a step S23 determines x, y by:

$$x=X/(X+Y+Z), y=Y/(X+Y+Z).$$

Then a step S24 discriminates whether x, y thus determined satisfy:

$$(y-x)^2+(x-0.31)^2 \leq 0.11^2,$$

namely whether the coordinate (x, y) is inside or on the boundary of the oval area shown in the x-y color chart in FIG. 5. If the discrimination in the step S24 turns out affirmative, the object of the area corresponding to the element 6A is identified as colorless, and a step S26 sets a flag FLGW(i, j) at "1". If said discrimination turns out negative, the object of said area is identified as colored, and a step S25 sets the flag FLGW(i, j) at "0". The sequence returns to the flow in FIG. 6, when the flag FLGW(i, j) has been set for all the elements 6A. If the object in an area is colorless, said area is called a colorless area, and, if the object in an area is colored, said area is called a colored area.

Figure 9:
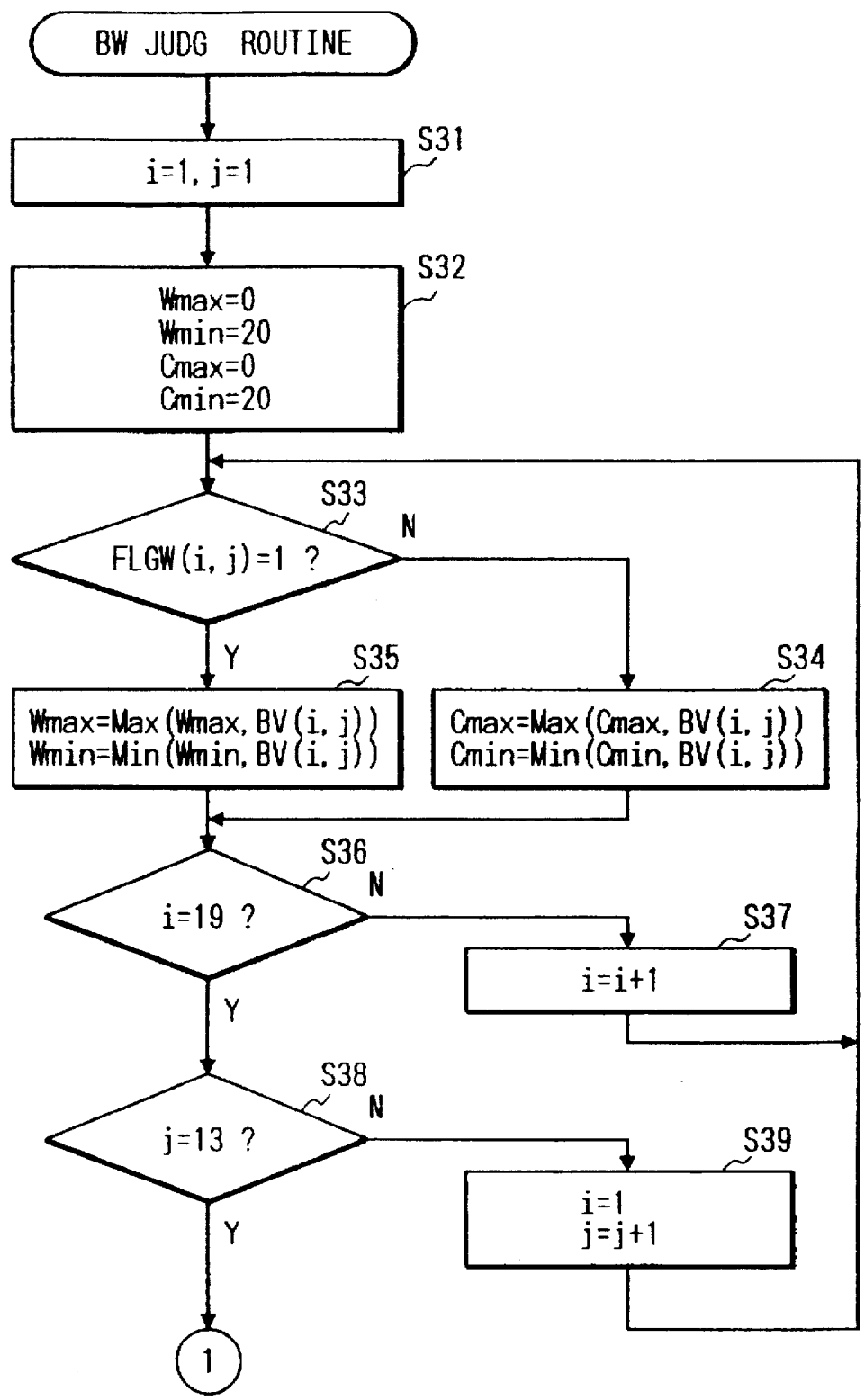
FIGS. 9 and 10 are flow charts of a subroutine for white-black judgment.
Figure 10:
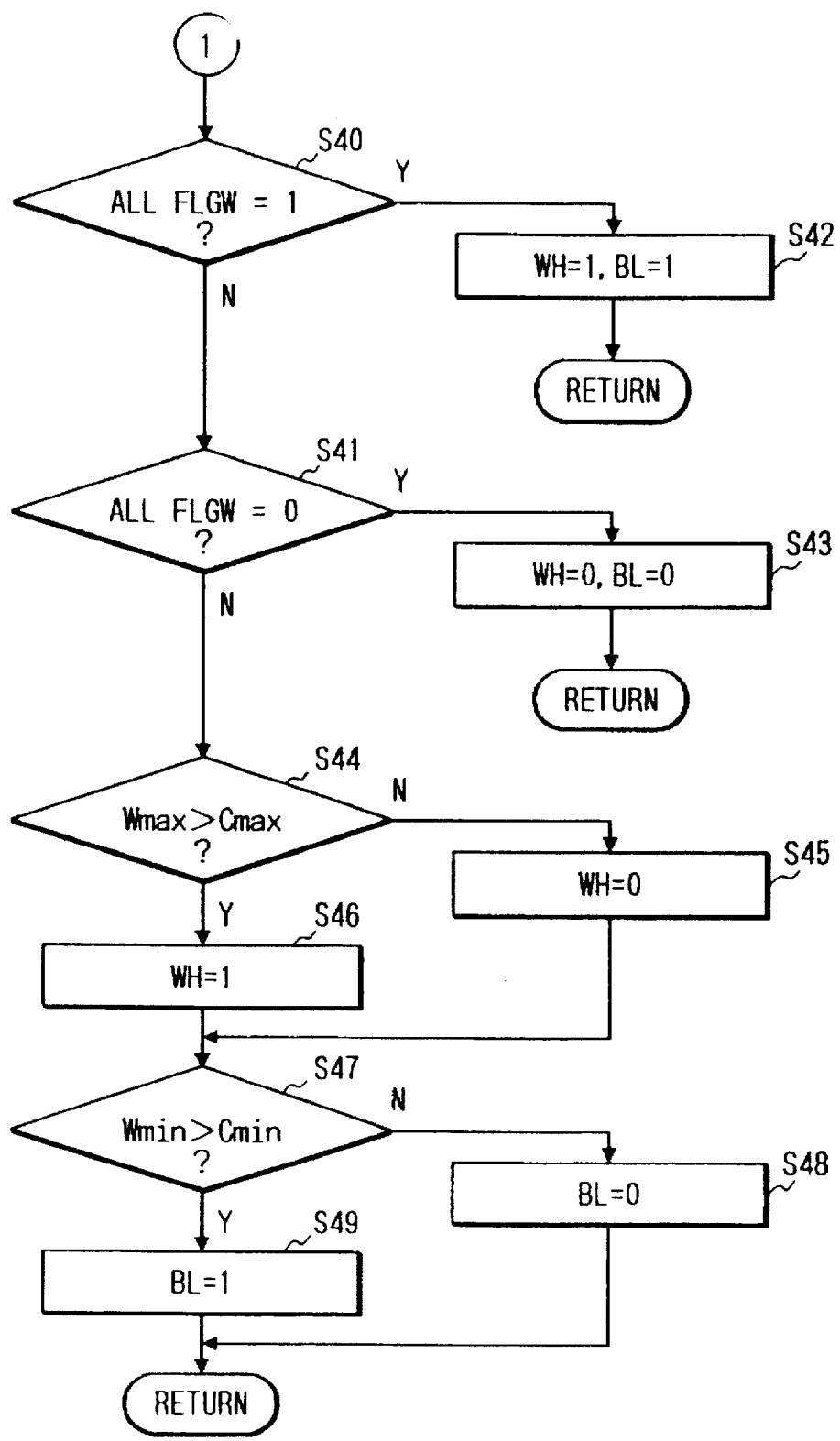

A step S4 in FIG. 6 executes a white-black judgment subroutine, shown in FIGS. 9 and 10, to be executed by the white-black judgment unit 13.

Referring to FIG. 9, a step S31 sets i=1 and j=1, and a step S32 executes initialization at Wmax=0, Wmin=20, Cmax=0 and Cmin=20, wherein Wmax is the maximum brightness (BV) in the colorless areas; Wmin is the minimum brightness in the colorless areas; Cmax is the maximum brightness in the colored areas; and Cmin is the minimum brightness in the colored areas.

A step S33 discriminates whether the flag FLGW (i, j) set for each element 6A is "1" or "0", and, if it is "1" (colorless area), a step S35 executes a process:

Wmax=Max(Wmax, BV(i, j))

Wmin=Min(Wmin, BV(i, j)), or if it is "0" (colored area), a step S34 executes a process:

Cmax=Max(Cmax, BV(i, j))

Cmin=Min(Cmin, BV(i, j)), wherein Max(A, B) means taking the largest of A and B, and Min (A, B) means taking the smallest of A and B. The process in the step S34 or S35 is conducted for all the elements 6A through steps S33 to S39, whereby Wmax, Wmin, Cmax and Cmin are determined.

Then the sequence proceeds to a step S40 in FIG. 10, which discriminates whether all the flags FLGW are "1", and, if affirmative, indicating that the entire object field is colorless, a step S42 sets variables WH and BL at "1". In the present embodiment, the black or white object is identified by the object brightness in the colored areas as will be explained later, but, said identification becomes impossible if the entire object field is uncolored, so that parameters WH=1, BL=1 are unconditionally-adopted, assuming that black and white objects are both present.

On the other hand, if the step S40 is negative, a step S41 discriminates whether all the flags FLGW are "0", and, if affirmative, indicates that the entire object field is colored, a step S43 sets the variables WH and BL at "0". After the step S42 or S43, the sequence returns to the main flow shown in FIG. 6.

If the step S41 is negative, corresponding to the mixed presence of colored and uncolored areas in the object field, a step S44 discriminates whether the maximum brightnesses Wmax, Cmax determined above satisfy a relation Wmax>Cmax. If said discrimination turns out affirmative, indicating the presence of a white object in the object field, a step S46 sets the variable WH=1, but, if said discrimination turns out negative, indicating the absence of a white object (black and/or gray objects only) in the object field, a step S45 sets the variable WH=0. Then the sequence proceeds to a step S47. The above-explained comparison allows identification of whether a white object is present, since the brightness of white color is always higher than the maximum brightness of the colored area.

The step S47 discriminates whether a condition Wmin<Cmin is met, and, if affirmative, indicating the presence of a black object in the object field, a step S49 sets a state BL=1, but, if negative, indicating the absence of a black object (white and/or gray objects only) in the object field, a step S48 sets a state BL=0. Thereafter the sequence returns to the main flow shown in FIG. 6. The above-explained comparison allows to identification of the presence of a black object, since the brightness of black color is always lower than the minimum brightness of the colored area.

Figure 11:
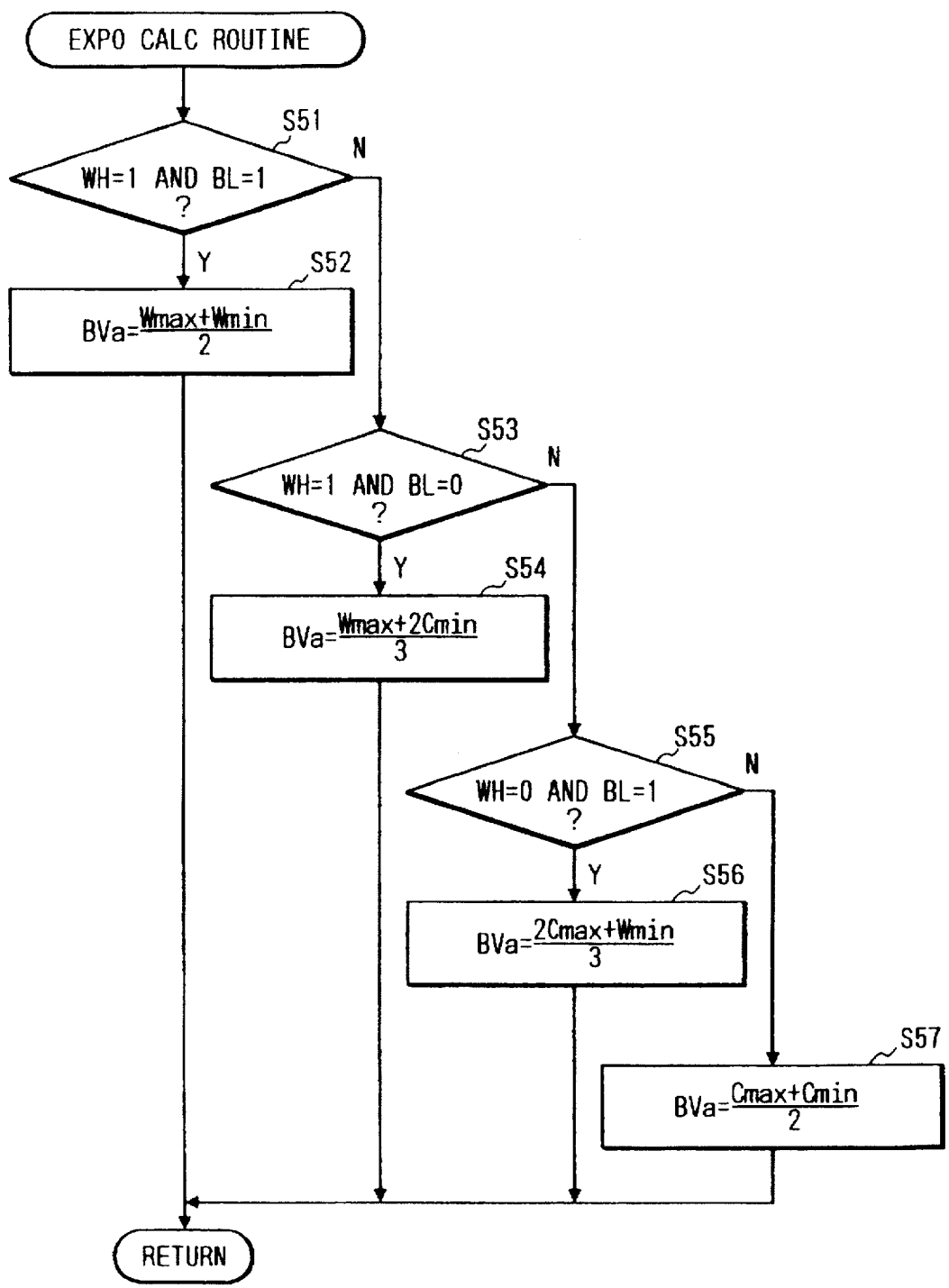
FIG. 11 is a flow chart of a subroutine for exposure value calculation.

A step S5 in FIG. 6 executes an exposure calculation subroutine, shown in FIG. 11, to be executed by the exposure calculation unit 14.

Referring to FIG. 11, a step S51 discriminates whether conditions WH=1 and BL=1 are both satisfied, and, if affirmative, indicating that black and white objects are both present in the object field, a step S52 calculates the exposure value BVa by:

$$BVa=(Wmax+Wmin)/2$$

and the sequence returns to the main flow in FIG. 6. This equation gives the ordinary exposure value as the average of the maximum and minimum brightnesses in the uncolored area. If the step S51 is negative, a step S53 discriminates whether conditions WH=1 and BL=0 are met, and, if said conditions are met, indicating that a white object is present but a black object is absent in the object field, a step S54 calculates the exposure value BVa by:

$$BVa=(Wmax+2Cmin)/3.$$

Then the sequence returns to the main flow in FIG. 6. The exposure value BVa calculated by this equation is weighted to the dark side, namely providing an overexposure.

If the step S53 is negative, a step S55 discriminates whether conditions WH=0 and BL=1 are met. If they are met, indicating that a black object is present but a white object is absent in the object field, a step S56 calculates the exposure value BVa by:

$$BVa=(2Cmax+Wmin)/3$$

and the sequence returns to the main flow in FIG. 6. The exposure value BVa calculated by this equation is weighted to the lighter side, namely providing an underexposure.

If the step S55 is negative, corresponding to the absence of a black or white object in the object field, a step S57 calculates the ordinary exposure value by:

$$BVa=(Cmax+Cmin)/2$$

and the sequence returns to the main flow in FIG. 6.

When a step S6 identifies a full-stroke depression of the shutter release button, a step S7 effects an exposure control (phototaking operation) according to the exposure value BVa determined in the above-explained step S5, and the sequence is terminated. If the step S6 is negative, the sequence proceeds to a step S8 for discriminating whether the shutter release button has been depressed by a half stroke, and, if said button is half-stroke depressed, the sequence returns to the step S6, but, if said button is not depressed, the sequence is terminated.

In the above-explained control sequence of the control circuit 10, the phototaking operation is conducted with an ordinary exposure value if black and white objects are both present, or both absent, in the uncolored area. Also if a white object is present but a black object is absent in the uncolored area, the phototaking operation is conducted with an exposure value of the overexposure side in comparison with the ordinary exposure value, whereby the white object can be reproduced as white. Also if a black object is present but a white object is absent in the uncolored area, the phototaking operation is conducted with an exposure value of the underexposure side in comparison with the ordinary exposure value, whereby the black object can be reproduced as black.

In the above-explained embodiment, the photosensor 6 and the light metering circuit 7 constitute the light metering means; the color judging unit 12 constitutes the judgment means; white-black judging unit 13 constitutes the judgment means 13; and the brightness calculation unit 11 and the exposure calculation unit 14 constitute the exposure value calculation means.

The equations for determining the exposure value are not limited to those shown in FIG. 11, but may assume other forms as long as they provide an overexposure when a white object is present but a black object is absent in the uncolored area, and an underexposure when a black object is present but a white object is absent in the uncolored area.

In the following there will be explained a second embodiment of the present invention, with reference to FIGS. 12 to 14D.

In the foregoing first embodiment, the sequence shown in FIG. 10 judges black and white by simple comparison of Wmax and Cmax and of Wmin and Cmin, but, if the coordinates (x, y) corresponding to Cmax and Cmin, namely corresponding to the colored areas with maximum and minimum object brightnesses, are positioned in the vicinity of the boundary of the oval area shown in FIG. 5, they will be very close to Wmax and Wmin. In the present embodiment, therefore, the x-y color chart is divided into three areas I, II and III as shown in FIG. 12, and the Cmax, Cmin are weighted at the comparison according to the area I, II or III to which the coordinates (x, y) corresponding to Cmax and Cmin belong.

Figure 13:
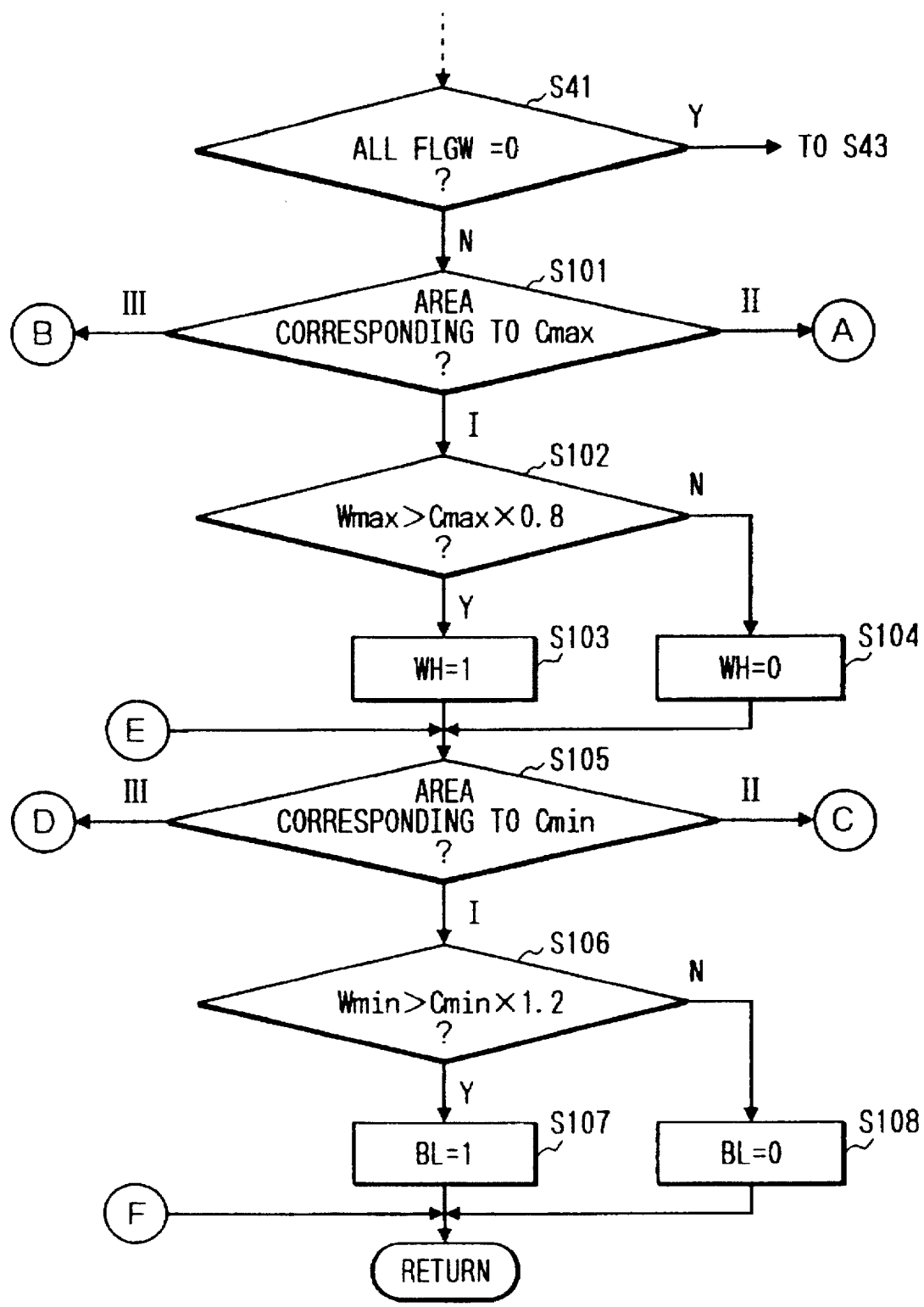
FIG. 13 is a flow chart showing a part of a subroutine for white-black judgment.
Figure 14A:
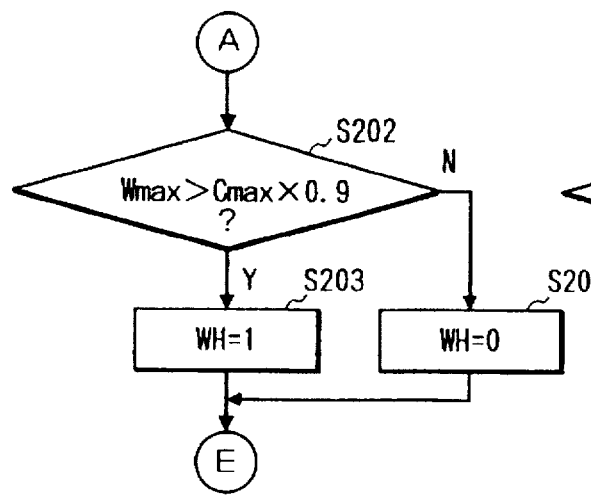
FIGS. 14A to 14D are flow charts connected the flow chart shown in FIG. 13.
Figure 14B:
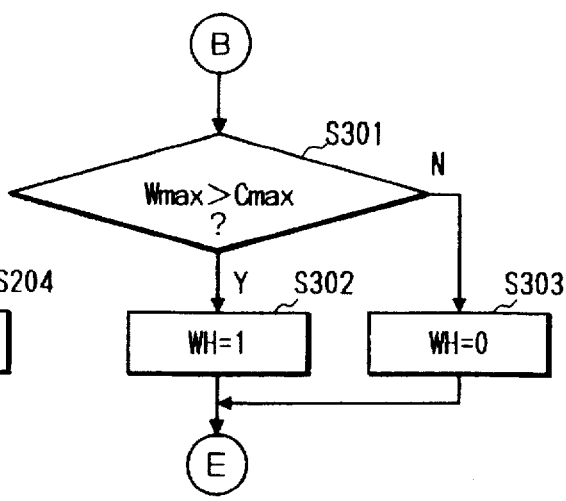
Figure 14C:
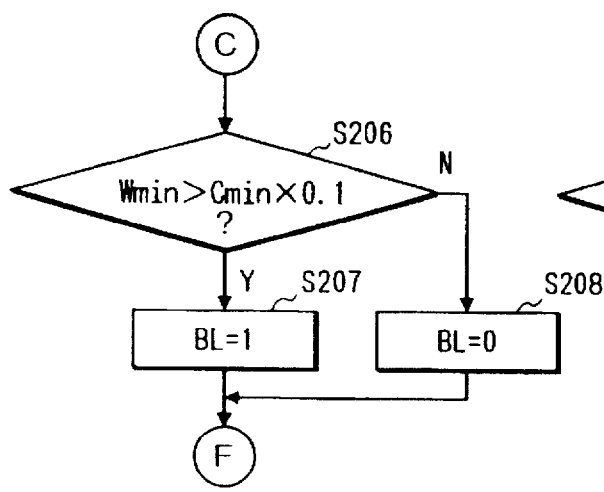
Figure 14D:
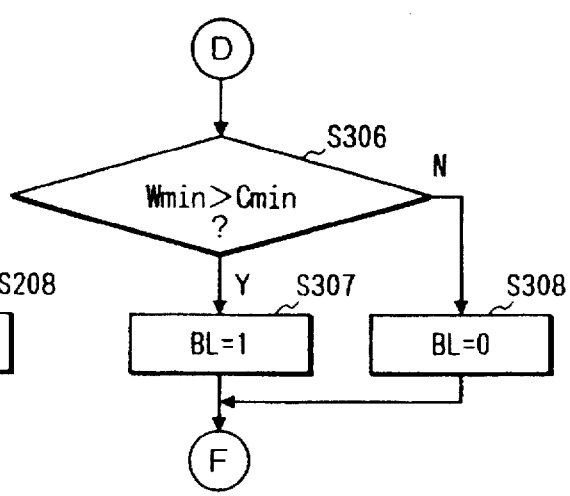

FIGS. 13 and 14 are flow charts corresponding to the steps S44 to S49 in FIG. 10.

Figure 12:
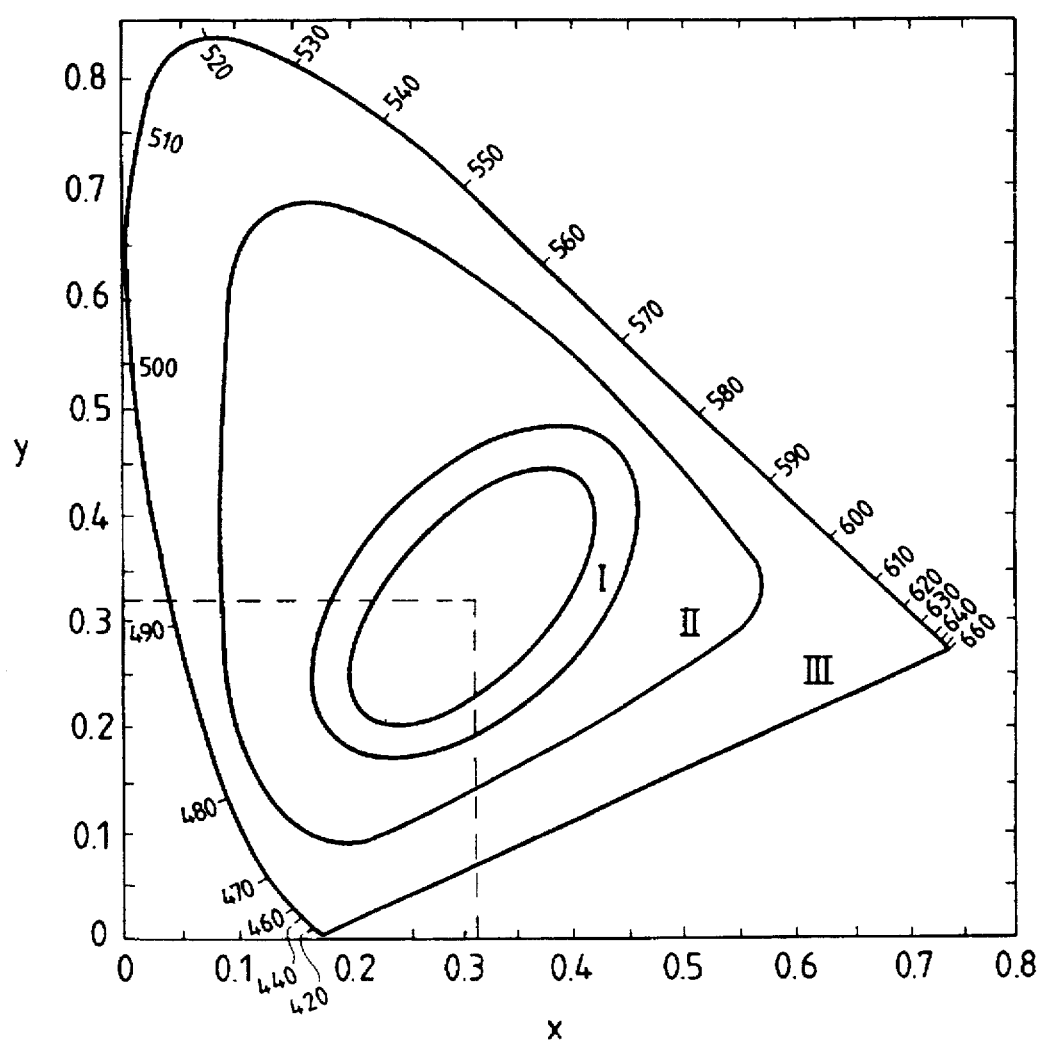
FIG. 12 is an x-y color chart relating to a second embodiment of the present invention.

If the step S41 in FIG. 10 is negative, namely if colored and uncolored areas are mixedly present in the object field, a step S101 in FIG. 13 discriminates the area in FIG. 12, which includes (x, y) corresponding to Cmax, namely the colored area with maximum object brightness, determined in the sequence shown in FIG. 9. If the area I is identified to include said (x, y), a step S102 discriminates whether the following relation is met:

Wmax>Cmax×0.8 and, if said discrimination turns out affirmative, a step S103 sets the variable WH=1, but, if negative, a step S104 sets the variable WH=0. Then the sequence proceeds to a step S105. On the other hand, if the step S101 identifies the area II, the sequence proceeds to a step S202 in FIG. 14A for discriminating whether the following relationship is met:

Wmax>Cmax×0.9.

If the result is affirmative, a step S203 sets WH=1, but, if negative, a step S204 sets WH=0, and the sequence proceeds to the step S105. If the step S101 identifies the area III, a step S301 in FIG. 14B discriminates, as in the first embodiment, if the following relationship is met:

Wmax>Cmax.

If the result is affirmative a step S303 sets WH=1, but, if negative, a step S304 sets WH=0, and the sequence proceeds to the step S105.

The step S105 discriminates the area containing the coordinates (x, y) corresponding to Cmin. If the area I is identified, a step S106 discriminates whether the following relationship is satisfied:

Wmin<Cmin×1.2.

If the result is affirmative, a step S107 sets BL=1, but, if negative, a step S108 sets BL=0. On the other hand, if the step S105 identifies the area II, a step S206 in FIG. 14C discriminates whether the following relationship is satisfied:

Wmin<Cmin×1.1.

If the result is affirmative, a step S207 sets WH=1, but, if negative, a step S208 sets WH=0. Also, if the step S105 identifies the area III, a step S306 in FIG. 14D discriminates whether the following relationship is satisfied:

Wmin<Cmin.

If the result is affirmative, a step S307 sets WH=1, but, if negative a step S308 sets WH=0.

The above-explained weighting of Cmax, Cmin provides the advantage of an improved precision of white-black judgment. Naturally the amounts of weighting are not limited to those in the present embodiment. The light metering is conducted over the entire object field in the foregoing first and second embodiments, but it may be conducted in a predetermined area in the object field. An example is shown in FIG. 15.

Figure 15:
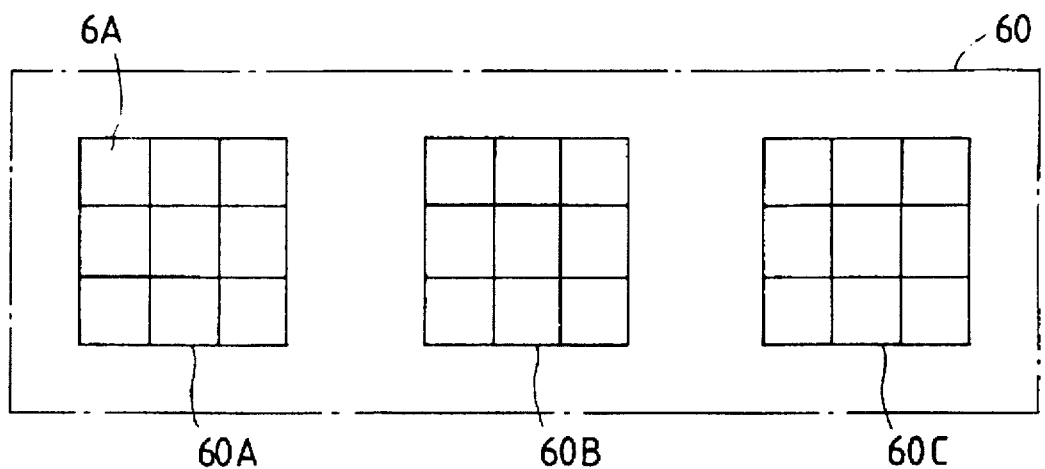
FIG. 15 is a view of a photosensor of another embodiment.

FIG. 15 illustrates the photosensor 60 employed in the present embodiment, and consisting of three photosensor elements 60A, 60B and 60C corresponding to three focus state detecting areas in the object field. Thus, in the present embodiment, the focus state detecting areas overlap with the light metering areas. Each divided element 6A constituting said light metering elements 60A–60C has the same structure as explained before. Based on the result of focus state detection in said three focus state detecting areas, the camera determines an area containing the object to which the phototaking lens is to be focused, and effects light metering in the thus determined focus state detecting area (hereinafter called focused area). More specifically, the camera activates the light metering elements 60A–60C through the light metering circuit 7, thereby calculating the brightness based on the light metering signal Y obtained from the light metering element of the focused area and discriminating whether the object in each focus state detecting area is colored or uncolored in a similar manner as explained above. Thus there is discriminated whether a white or black object is present in the uncolored areas in the focused area, through the comparison of the maximum brightness Cmax, minimum brightness Cmin in the colored areas and the maximum brightness Wmax, minimum brightness Wmin in the uncolored areas contained in the above-mentioned focused area. Subsequently the exposure value is determined through a process similar to that shown in FIG. 11. Since white-black judgment can be conducted on the object in the focused area, namely on the main object, it is rendered possible to reproduce said main object as white or black if it is white or black. It is also conceivable to employ the photosensor 6, instead of the above-explained photosensor 60, and to utilize areas substantially overlapping with the focus state detecting areas.

Figure 16A:
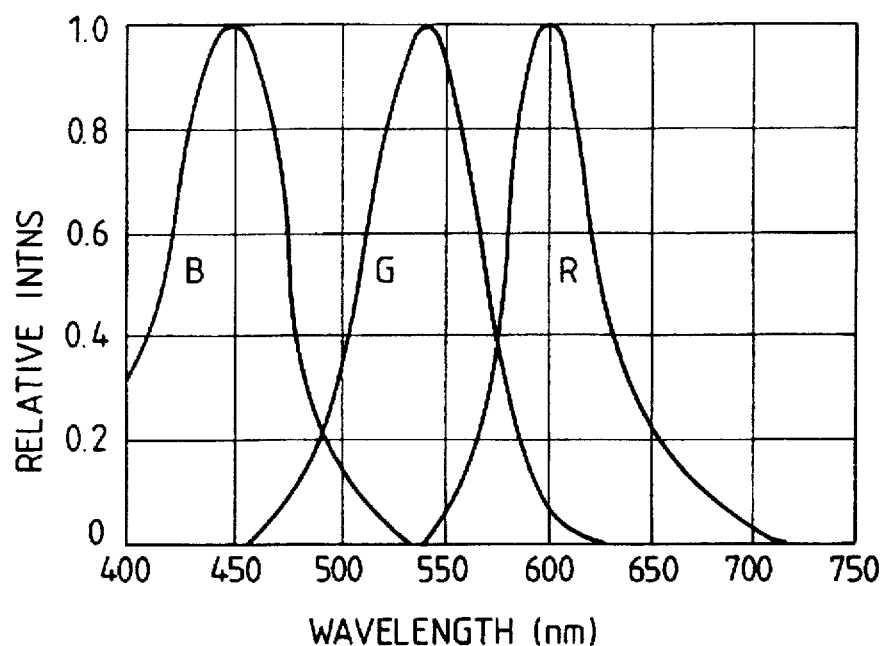
FIGS. 16A and 16B are charts showing variations in the sensitivity characteristics of filters.
Figure 16B:
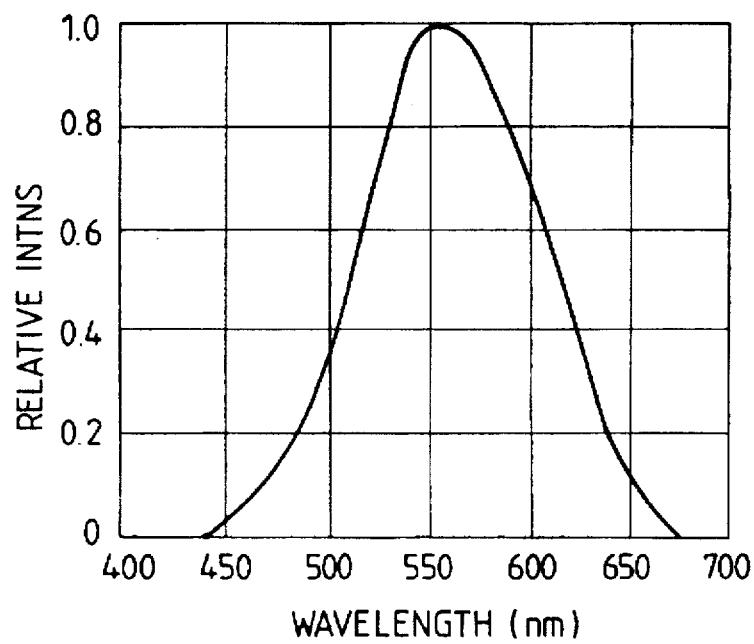

The foregoing embodiments employ the filters of the sensitivity characteristics shown in FIG. 4, but the color judgment can also be made with the filters of the characteristics as shown in FIGS. 16A or 16B, if the output signals are suitably weighted and added.

FIG. 16A shows the sensitivity characteristics of three primary color filters employed for example in color television. In such filters, a sensitivity distribution as shown in FIG. 16B can be obtained by determining Y by:

$Y=0.30R+0.59G+0.11B$, and the brightness can be obtained by multiplying Y with a predetermined proportion constant. Also in this case, since B:G:R=1:1:1 in the uncolored state, the colored state and the uncolored state can be identified by the aberration from B:G:R=1:1:1. More specifically, for example, an uncolored state can be identified if ratios B/G and R/G are both within a range from 0.8 to 1.2.

Figure 17:
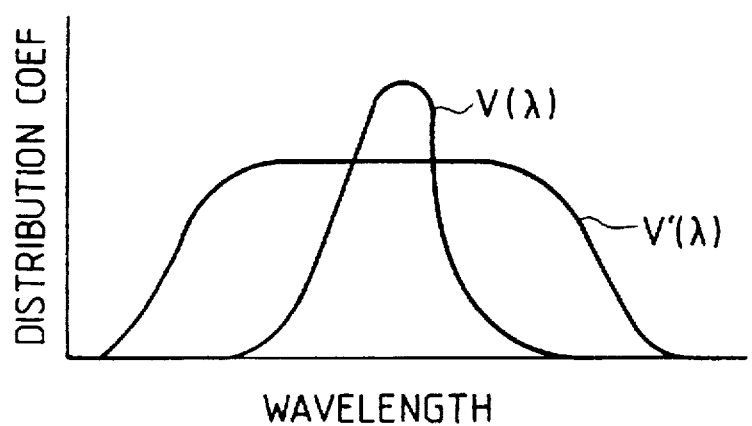
FIG. 17 is a chart showing the difference between the relative standard visual sensitivity and the sensitivity of a photographic film.

Ordinary photographic films have a photosensitive spectral region, as indicated by V'(λ) in FIG. 17, wider than y(λ) mentioned above, or the standard relative visual sensitivity V(λ). Consequently, an exact brightness value matching the sensitivity characteristics of the film can be obtained by determining the sensitivity characteristics V'(λ) from the light metering signals X, Y, Z or R, G, B shown in FIG. 16A, and calculating the brightness accordingly.

Also in the foregoing embodiments, the white-black judgment is conducted according to the brightness values in the colored areas and those in the uncolored areas, but similar judgment can be made on the light metering signals Y in the colored and uncolored areas, since Y is proportional to the brightness.

As explained in the foregoing, the present invention is featured by employing light metering means for releasing a light metering signal, which contains information on the color of the object positioned in each of plural areas defined in the object field, judging whether the object in each area is colored or uncolored based on said light metering signal, then judging whether a white or black object is present in each area defined as uncolored, based on the light metering signal corresponding to such area defined as uncolored and the light metering signal corresponding to the areas defined as colored, and calculating the exposure value from said light metering signals according to the result of said judgment, whereby a black object can be reproduced as black and a white object can be reproduced as white, regardless of the distance to said objects.

Figure 18:
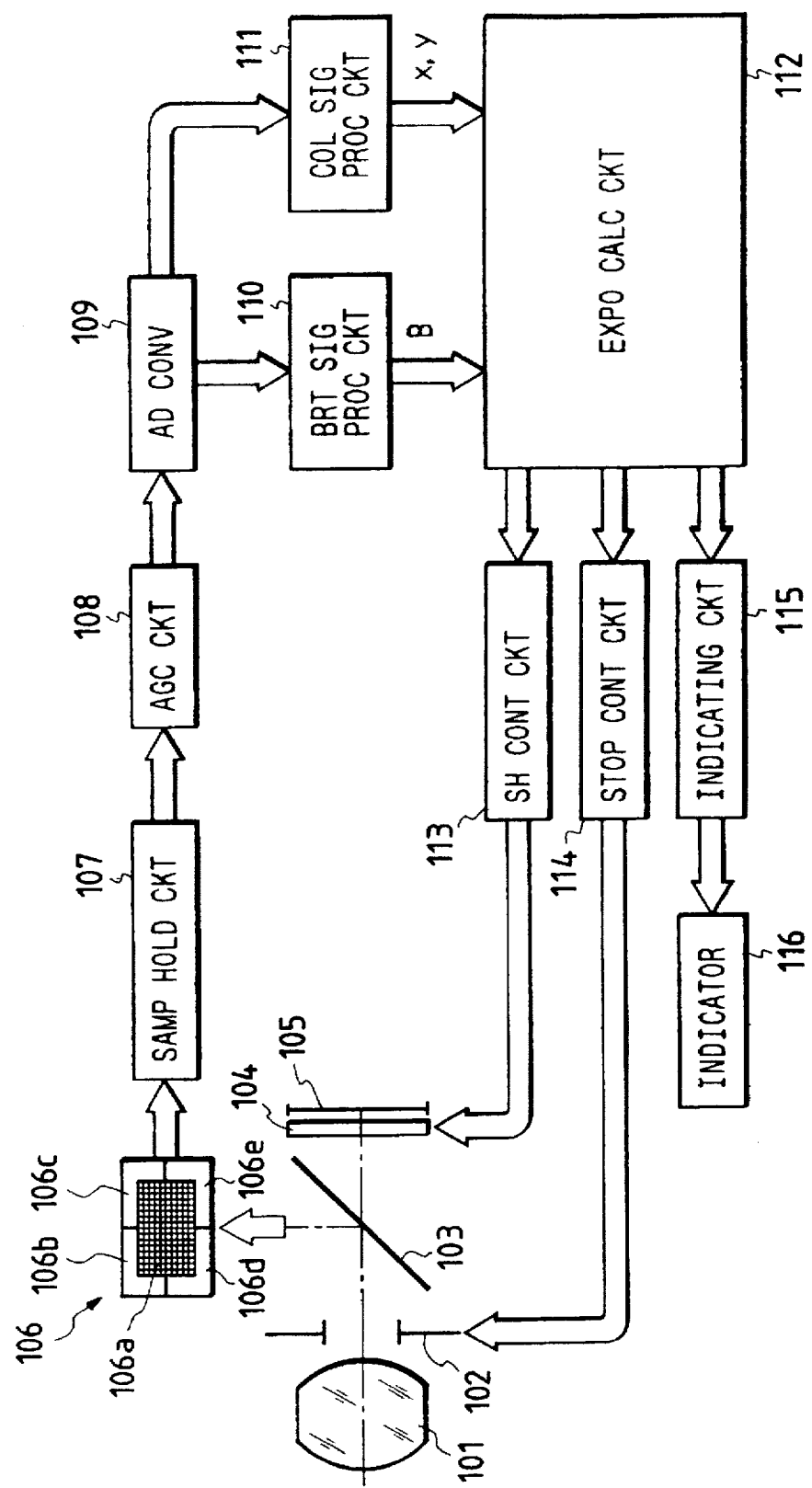
FIG. 18 is a block diagram of another embodiment.

FIG. 18 is a block diagram of another embodiment of the present invention.

In an ordinary phototaking operation, the light beam transmitted by a phototaking lens 101 and a diaphragm 102 of a single lens reflex camera is transmitted, as a main mirror 103 is retracted upwards, by a shutter 104 and reaches a film 105. On the other hand, at the observation of the image through the view finder, the light beam transmitted by the phototaking lens 101 and the diaphragm 102 is reflected by said main mirror 103, further transmitted by an unrepresented finder screen and a pentagonal prism, and reaches a light-color metering unit 106.

Said light-color metering unit 106 for effecting the light metering and the color measurement of the object field, has a central part 106a and peripheral parts 106b–106e. Said central part 106a is composed of a CCD image sensor containing 209 pixels arranged in 19 horizontal rows and 11 vertical columns, wherein each pixel is composed of three elements respectively provided with unrepresented red, green and blue filters. The peripheral parts 106b–106e are used for automatic gain control (AGC) and for light metering and color measurement.

In the following there will be explained an outline of said AGC.

The AGC can be classified into software AGC and hardware AGC. The software AGC is to control the charge accumulating time of the CCD image sensor based on the preceding light metered value, and is executed by an AGC circuit 108 to be explained later. The hardware AGC is to control the charge accumulating time by an unrepresented electronic circuit, and is activated at the start of power supply when the preceding light metered value is not available, or at an abrupt variation of the brightness whereby the preceding light metered value cannot be used as a reference.

The output signal of said light-color metering unit 106 is subjected to a sample holding by a sample hold circuit 107, then to automatic gain control by said AGC circuit 108, and is A/D converted by an A/D converter 109. Said output signal, after A/D conversion, is supplied to a brightness signal processing circuit 110 for conversion into the brightness B and to a color signal processing circuit 111 for conversion into color coordinates (x, y), and the results of said conversions are both supplied to an exposure calculating circuit 112. Said circuit 112 is composed of a microcomputer and peripheral components, judges white color by a method to be explained later and calculates the appropriate exposure value by correcting the brightness B. The shutter 104 and the diaphragm 102 are respectively controlled by a shutter control circuit 113 and a diaphragm control circuit 114, according to said appropriate exposure value. Said value is also on a displayed on a display unit 116 through a display circuit 115.

Figure 19:
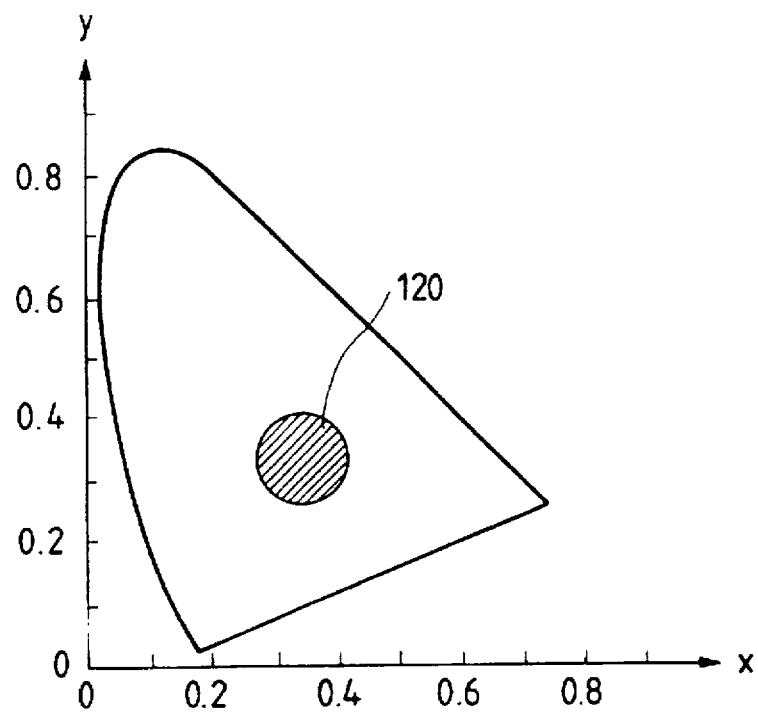
FIG. 19 is an XYZ color chart.

FIG. 19 is an XYZ color system chart. In the present embodiment, for the purpose of simplifying the calculation, the uncolored area is represented in approximate manner by a hatched circular area 120 having the center at (x, y)=(0.34, 0.33) and a radius of 0.06. When the color of the object is positioned inside said area, if the brightness B obtained by the light-color metering unit 106 is directly used in the calculation of exposure, a white object tends to be underexposed and a black object tends to be overexposed. Consequently there is required a correction of about +2 EV for a white object and about −2 EV for a black object.

Figure 20:
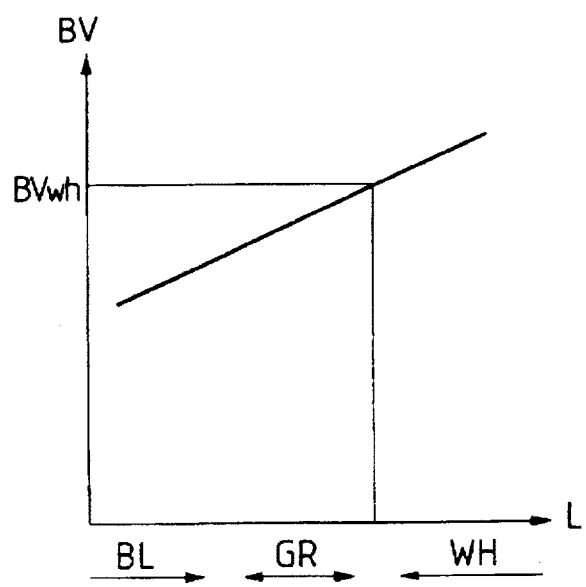
FIG. 20 is a chart showing the relationship between the luminocity and the maximum brightness of an uncolored object illuminated by solar light on the ground.

FIG. 20 shows the experimentally determined relationship between the luminocity and the maximum brightness of an uncolored object illuminated by the solar light on the ground. The abscissa indicates the luminocity L, varying from black to gray and to white as the position becomes farther from the origin point. The ordinate indicates the brightness BV, brighter as the position goes upward from the origin point. As shown in FIG. 20, the object can be identified as white, if it is uncolored and the brightness is higher than a predetermined value BVwh, which is about 9BV.

Figure 21:
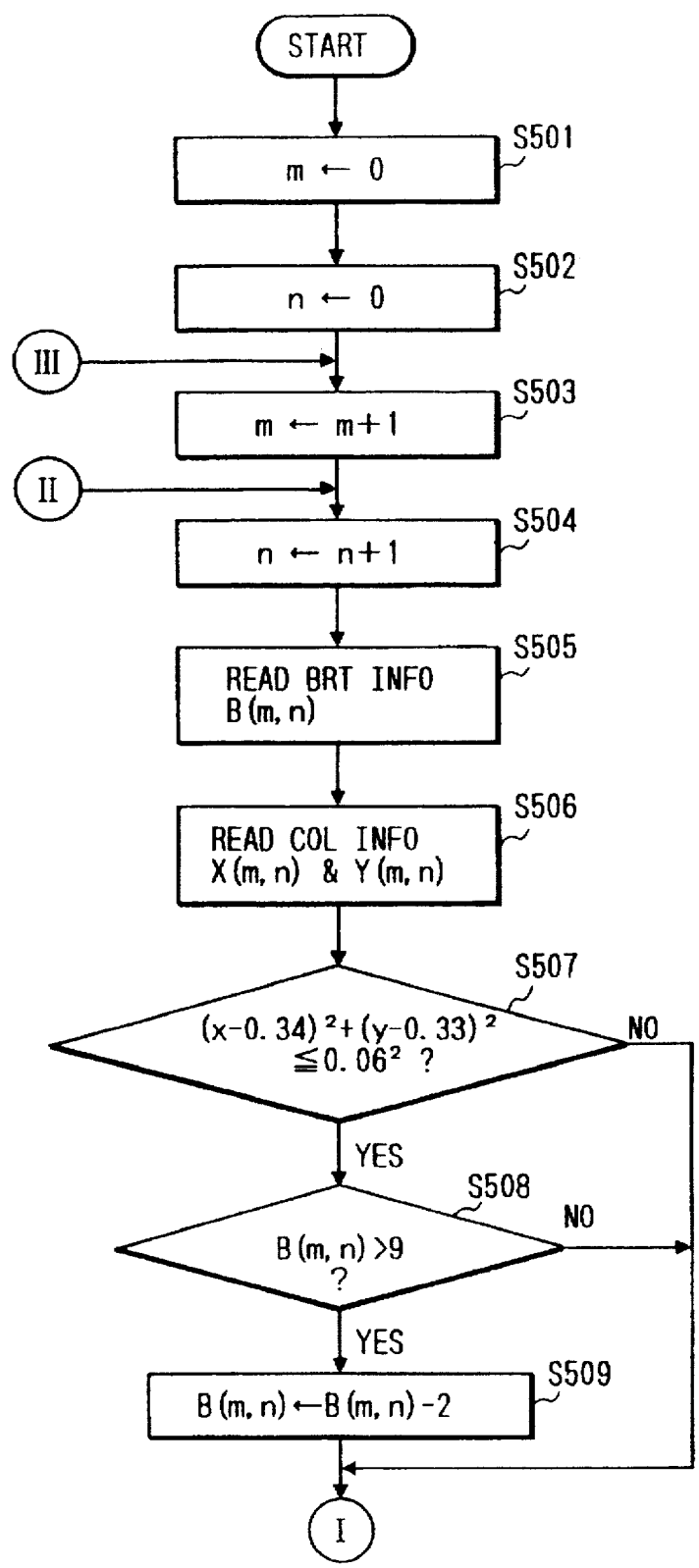
FIGS. 21 and 22 are flow charts of an example of the exposure calculating program to be executed by a microcomputer of the exposure calculation circuit.
Figure 22:
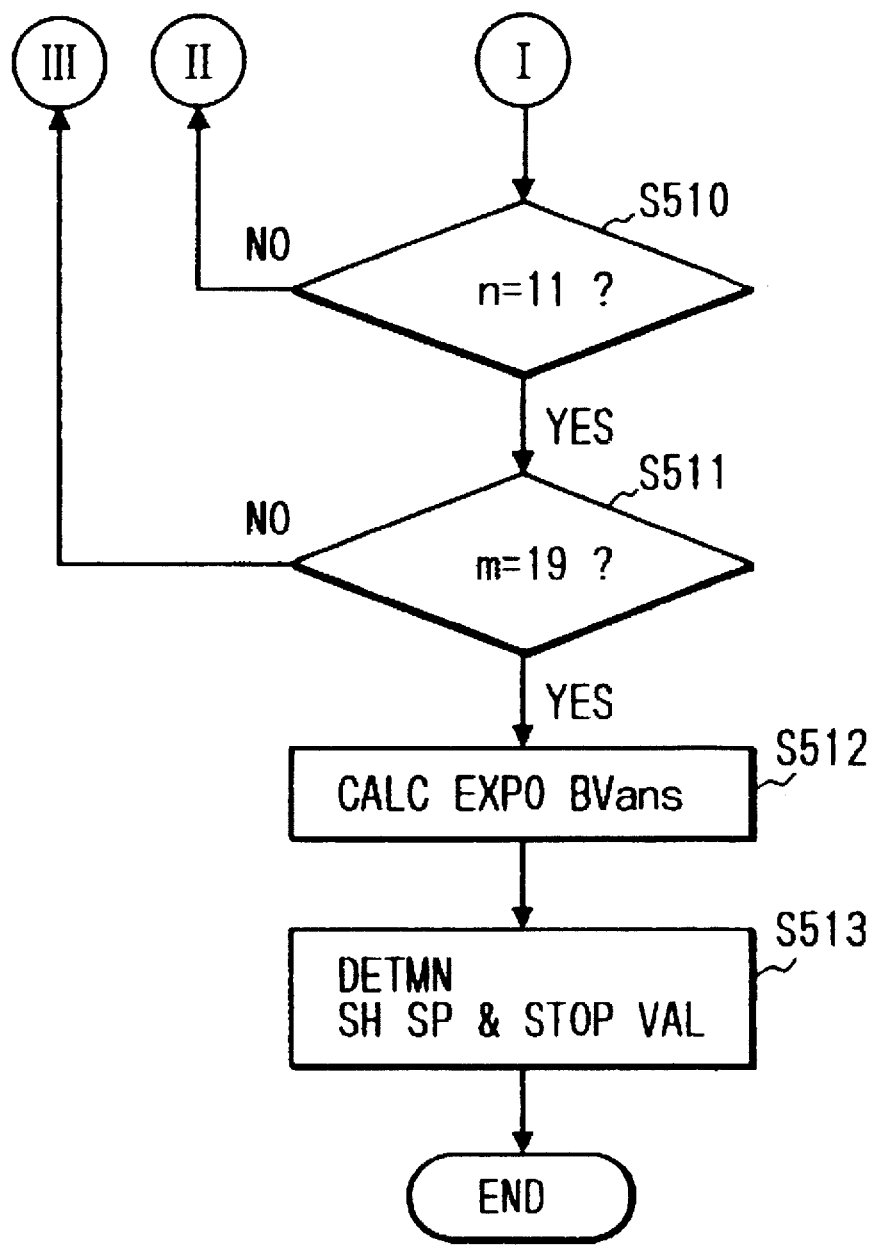

FIGS. 21 and 22 are flow charts showing an example of the sequence of exposure calculation, to be executed by the microcomputer of the exposure calculation circuit 112. In the following there will be explained the function of the light metering device, with reference to said flow charts. The microcomputer initiates to execution of said sequence, in response to a half-stroke depression of an unrepresented shutter release button.

At first, steps S501, S502 initialize horizontal address m and vertical address n, indicating the position in 209 pixels in the central area 106a, to "0". Subsequent steps S503, S504 respectively step up addresses (m, n) and a step S505 reads the brightness information B(m, n) from the pixel of an address (m, n). A next step S506 reads the color information x(m, n), y(m, n) from the pixel of the address (m, n).

Then a step S507 discriminates whether the color information x(m, n), y(m, n) obtained by color measurement is positioned within the circular area 120 in the XYZ color chart shown in FIG. 19, with the center at (x, y)=(0.34, 0.33) and with a radius of 0.06, namely whether the object is uncolored. If said color information is within said circular area, the object is identified as uncolored and the sequence proceeds to a step S508, but, if not within said area, the object is identified as colored and the sequence proceeds to a step S510 shown in FIG. 22. The step S508 discriminates whether the brightness B(m, n) of the pixel at an address (m, n) is larger than BV9, and the sequence proceeds to a step S509 or S510 in FIG. 22 respectively if the result is affirmative or not. Thus, if the steps S507 and S508 identify that the pixel at the address (m, n) is uncolored and has a brightness higher than BV9, the object portion corresponding to said pixel is identified as white.

In the step S509, since the object corresponding to the pixel of the address (m, n) is white, a correction is made by subtracting "2" from the brightness B(m, n) of said pixel. Then the step S510 in FIG. 22 discriminates whether the address n is "11", and the sequence proceeds to a step S511 or returns to the step S504 in FIG. 21, respectively if the result is affirmative or not. The step S511 discriminates whether the address m is "19", and the sequence proceeds to a step S512 or returns to the S503 in FIG. 21, respectively if the result is affirmative or not. In this manner the steps S505 to S509 are executed for all the pixels in the central light-color metering area 106a. Then the step S512 calculates the appropriate exposure value BVans according to a known exposure calculating algorithm, based on the brightness B(m, n) after correction. A succeeding step S513 determines the shutter speed and the diaphragm aperture based on the calculated appropriate exposure value BVans.

In this manner, if the object measured by the light-color metering unit 106 is uncolored and has a brightness higher than BV9, the object is identified to have a high luminocity, namely to be whitish, and the exposure is calculated by a corrected brightness, so that an appropriate exposure is always obtained for a whitish object.

Figure 23:
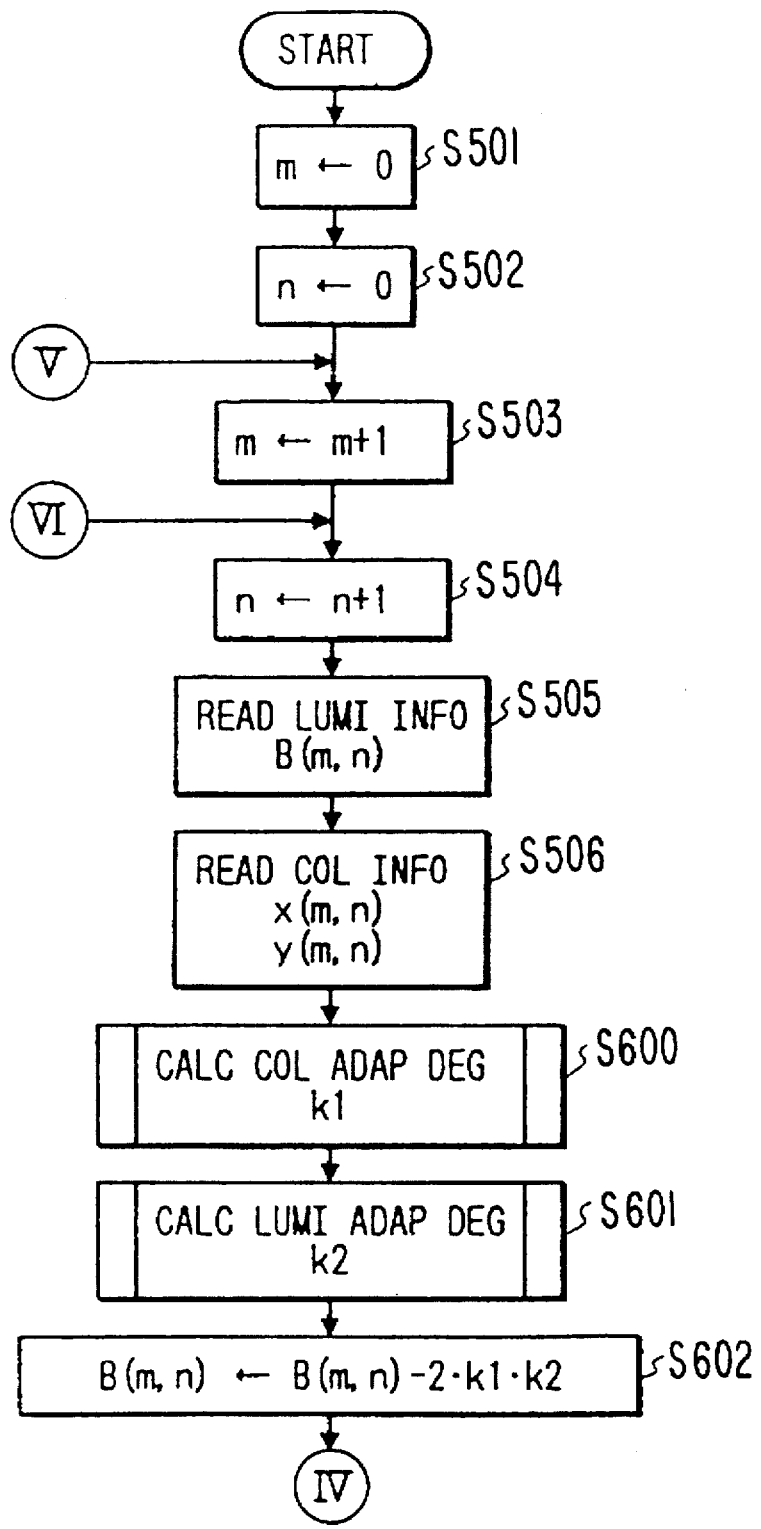
FIGS. 23 and 24 are flow charts of another example of the exposure calculating program.
Figure 24:
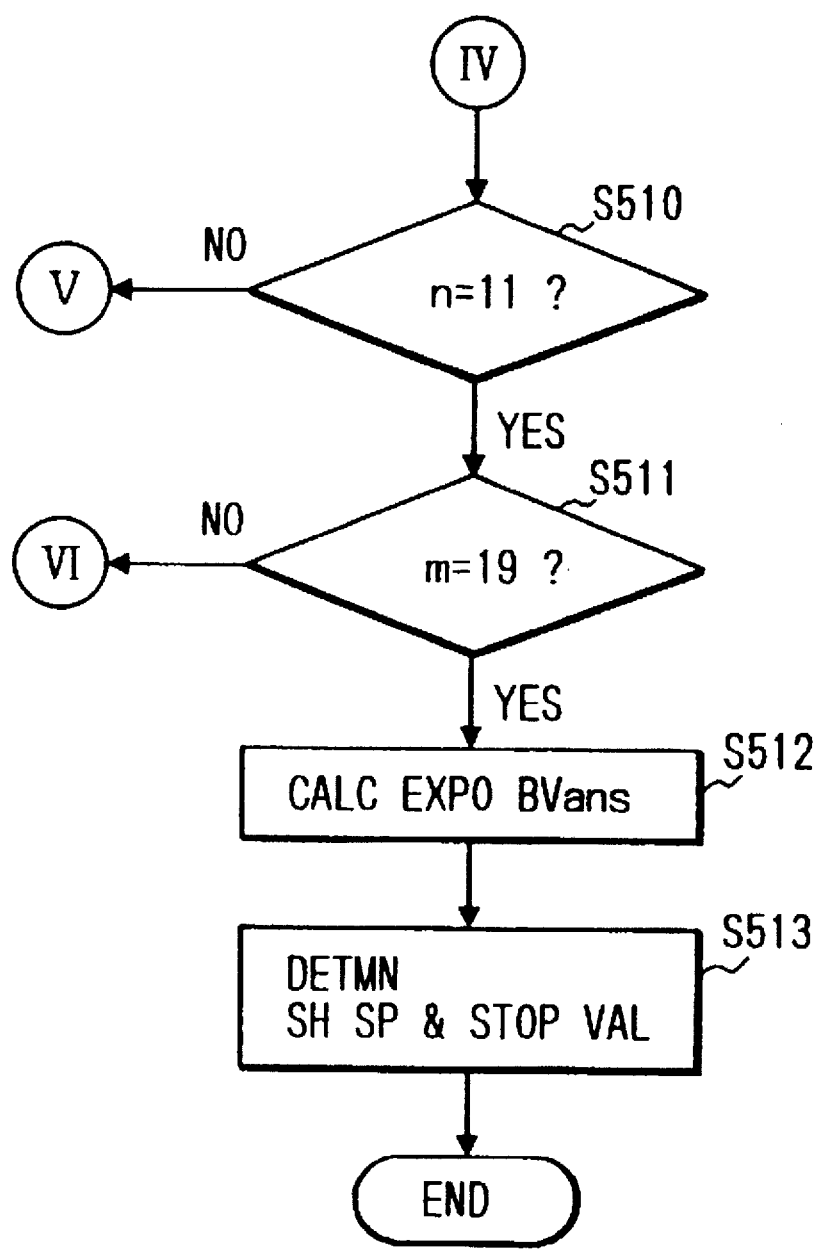

FIGS. 23 and 24 are flow charts showing another example of the sequence of exposure calculation, in which the white color is judged by fuzzy theory, and the brightness is corrected according to the result of said judgment. In the following description, the steps equivalent to those in FIGS. 21 and 22 are represented by the same numbers, and the description is given principally on the different points of this sequence.

Steps S501 to S504 execute initialization and increment of the addresses (m, n) of the pixel in the central area 106a, and succeeding steps S505, S106 read the brightness information B(m, n) and the color information x(m, n), y(m, n) from the pixel of the address (m, n).

Figure 25:
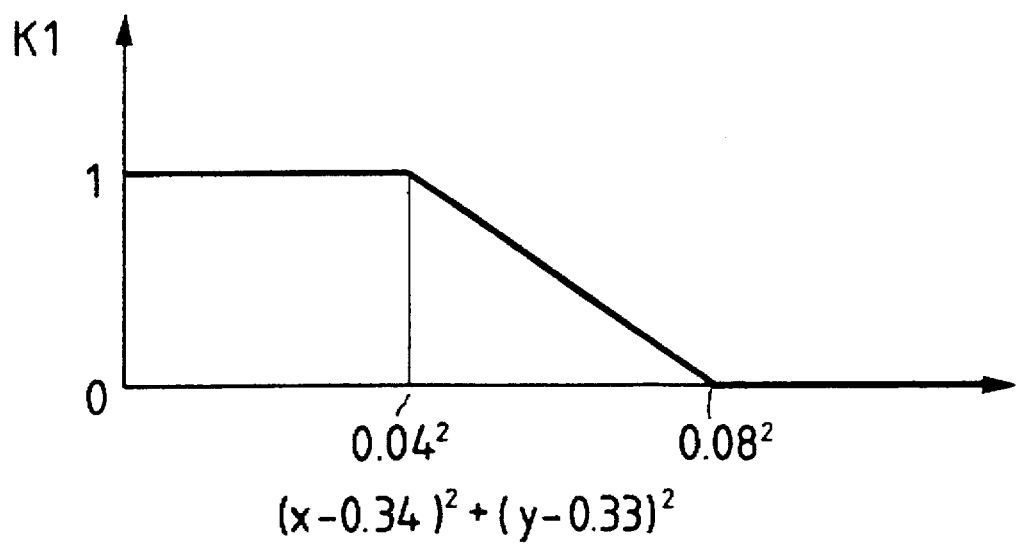
FIG. 25 is a chart showing a membership function indicating the level of absence of color.
Figure 26:
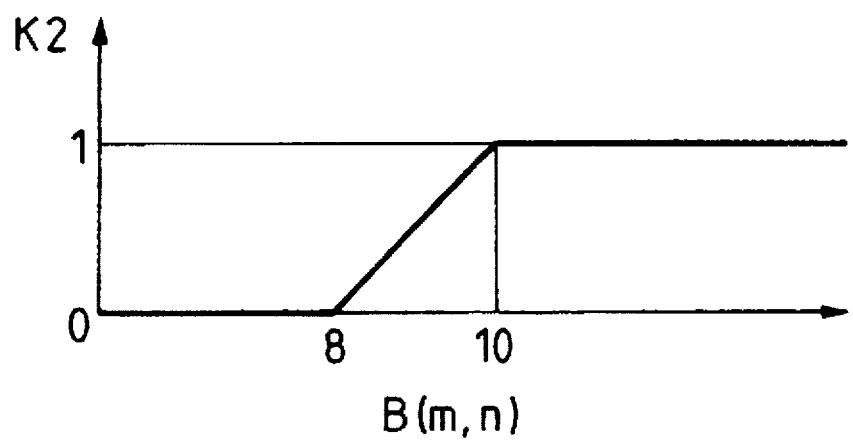
FIG. 26 is a chart showing a membership function indicating the level of high brightness.

Then a step S600 calculates the level of fitness k1 of the color information x(m, n), y(m, n) of color measurement in the uncolored area 120 in the XYZ color chart shown in FIG. 19. FIG. 25 shows a membership function representing said level of fitness k1. Then a step S601 calculates the level of fitness k2 that the brightness B(m, n) obtained by light metering is in a high brightness range. FIG. 26 shows a membership function representing said fitness level k2. A step S602 corrects the brightness B(m, n) of the pixel of an address (m, n) by subtracting 2·k1·k2.

The k1 assumes a value "1" when the object is evidently uncolored, and the k2 assumes a value "1" when the object has a sufficiently high brightness, so that the correction value becomes "2". On the other hand, k1 becomes "0" when the object is evidently not uncolored, and k2 becomes "0" when the object brightness is very low, so that the correction value becomes "0". In other situations both k1 and k2 assume a value between "0" and "1", so that the correction value assumes a value between "0" and "2".

As explained in the foregoing, the white color judgment and correction in the steps S505 to S602 are conducted for all the pixels in the central light-color metering unit 106a, and the appropriate exposure value BVans is calculated according to the exposure calculating algorithm, based on the brightness B(m, n) after correction. Then the shutter speed and the diaphragm aperture are determined according to thus calculated appropriate exposure value B(m, n).

As explained in the foregoing, the fitness level k1 of the result of color measurement by the unit 106 to the uncolored state is calculated by a membership function representing the uncolored level of the color, while the fitness level k2 of said result to the high brightness state is calculated by a membership function representing the high brightness level of the brightness, and the brightness is corrected by said fitness levels k1, k2 in the calculation of the exposure value. Thus, in comparison with the method of judging the color or brightness through simple comparison with a predetermined value, there is achieved a more delicate exposure correction, with smoother variations in the exposure value around the boundary between an area with no correction and an area with correction.

In the above-explained embodiment, the white color judgment and the brightness correction are conducted according to the results of light metering and color measurement in the central area 106a, but the results of measurements in the peripheral areas 106b–106e may also be similarly processed and utilized for correcting the brightness in those identified as white in said peripheral areas. Also the number of divisions of the light-color metering areas is not limited to that in the above-explained embodiment, and it is also possible to provide the light metering area and the color measuring area in different positions.

In the above-explained embodiment, the light-color metering unit 106 constitutes the light metering means and the color measuring means, and the exposure calculation circuit 112 constitutes the luminocity judging means and the brightness correction means.

According to the present invention, as explained in the foregoing, if the object is identified to be uncolored and to have a brightness higher than a predetermined value, based on the results of light metering and color measurement in the object field, said object field is identified to have a high luminocity and the brightness thereof is corrected. Therefore, an appropriate exposure value can always be obtained for a whitish object.

Also according to the present invention, the light metering and color measurement are conducted in plural divided areas of the object field, and the white color judgment for the object and the brightness correction therefor are conducted according to the results of such measurements,-so that an even more appropriate exposure value can be obtained for a whitish object.

Also according to the present invention, if the brightness of a divided light-metering area, corresponding to a divided color measurement area identified as uncolored, is higher than a predetermined value, said divided light-metering area is identified to have a high luminocity, so that an even more appropriate exposure value is obtained for a whitish object.

Also according to the present invention, the light metering means and the color measuring means are constituted by a same element, so that the space inside the camera can be saved. In addition, there is obtained an exact correspondence between the divided light-metering area and the divided color-measuring area in the object field, thereby enabling exact white color judgment and exact brightness correction based thereon.

Also according to the present invention, the luminocity of the object field is estimated by fuzzy theory, based on the results of light metering and color measurement, and the brightness is corrected according to said estimated luminocity. Thus the white color judgment can be conducted in more delicate and exact manner, and an exact brightness correction can be achieved, so that an appropriate exposure value can be obtained for a whitish object.

Also according to the present invention, a membership function representing the uncolored level of color is employed for calculating the fitness level of the result of color measurement to the uncolored state, while another membership function representing the high brightness state of brightness is employed for calculating the fitness level of the result of light metering to the high brightness state, and the luminocity of the object field is estimated from these fitness levels in the correction of brightness. Thus, in comparison with the method of judging color or brightness through simple comparison with predetermined values, there is achieved more delicate exposure correction, with smoother variation in the exposure value around the boundary between an area with correction and another area without correction.

What is claimed is:

1. An exposure calculation device for use in a camera, comprising:

light metering means for effecting light metering in each of plural light metering areas divided in the object field and producing corresponding light metering signals;

color measuring means for generating information relating to the color of the object, in each of plural color measuring areas divided in the object field;

first judgment means for judging whether the object in each color measuring area is colored or uncolored, based on said color information, where white judged is to be uncolored, and defining the color measuring areas in which the object is colored as colored areas, and the color measuring areas in which the object is uncolored as uncolored areas;

second judgment means for judging whether a white or black object is present in a predetermined uncolored area, based on the light metering signal from the light metering areas corresponding to said colored areas and the light metering signal from the light metering areas corresponding to said uncolored areas; and exposure value determining means for determining the exposure value based on said light metering signals and according to the results of judgment of said first and second judgment means.

2. An exposure calculation device according to claim 1, wherein said light metering areas and said color measuring areas are the same.

3. An exposure calculation device according to claim 1, wherein said light metering means and said color measuring means include a light metering circuit.

4. An exposure calculation device according to claim 1, wherein said exposure value determining means includes:

means for determining an ordinary exposure value from said light metering signal in an ordinary method, in case said predetermined uncolored area contains both a white object and a black object or does not contain a white object or a black object;

means for determining an exposure value providing an overexposure in comparison with said ordinary exposure value in case said predetermined uncolored area contains a white object but does not contain a black object; and means for determining an exposure value providing an underexposure in comparison with said ordinary exposure value in case said predetermined uncolored area contains a black object but does not contain a white object.

5. An exposure calculation device according to claim 1, wherein said exposure value determining means includes:

means for weighing the light metering signals by dividing said colored areas into plural groups according to the colored level; and means for determining the exposure value based on thus weighted light metering signals.

6. A light metering device for use in a camera, comprising:

light metering means for measuring the brightness of the object field;

color measuring means for measuring the color of the object field;

luminosity judgment means for judging that said object field has a high luminosity when the object field is measured as uncolored by said color measuring means, where white is measured as uncolored, and as having a brightness higher than a predetermined value by said light metering means; and brightness correction means for correcting the brightness measured by said light metering means, when said luminosity judgment means identifies that the object field has a high luminosity.

7. A light measuring device according to claim 6, wherein said light metering means is composed of plural divided light metering units for effecting light metering respectively in plural light metering areas into which the object field is divided.

8. A light metering device according to claim 6, wherein said color measuring means is composed of plural divided color measuring units for effecting color measurement respectively in plural color measuring areas into which the object field is divided.

9. A light metering device according to claim 6, wherein:

said light metering means is composed of plural divided light metering units for effecting light metering respectively in plural light metering areas into which the object field is divided;

said color measuring means is composed of plural divided color measuring units for effecting color measurement respectively in plural color measuring areas into which the object field is divided, thereby determining colored areas and uncolored areas;

said luminosity judgment means identifying that a divided light metering area has a high luminosity if the brightness of said area, corresponding to a divided color measuring area identified as uncolored, is higher than a predetermined value; and said brightness correction means correcting the brightness of a divided light metering area of which luminocity is identified as high by said luminocity judgment means.

10. A light metering device according to claim 6, wherein said light metering means and said color measuring means include a light metering circuit.

11. A light metering device according to claim 6, wherein said luminosity judgment means includes means for judging the luminosity of the object field according to fuzzy estimation, based on the results of color measurement by said color measuring means and light metering by said light metering means.

12. A light metering device according to claim 11, wherein said luminosity judgment means includes:

means for determining a first fitness relating to the uncolored level of the result of color measurement by said color measuring means utilizing a first membership function indicating the uncolored level of the color measurement;

means for determining a second fitness relating to the high brightness level of the result of light metering by said light metering means utilizing a second membership function indicating the high brightness level of the brightness; and means for determining the luminosity of said object field based on said first and second fitnesses.

13. An exposure calculation device for use in a camera, comprising:

a light metering circuit to effect light metering in each of plural light metering areas into which an object field is divided and for producing corresponding light metering signals;

a brightness calculation unit to determine a brightness value for each of the light metering areas based on the light metering signals;

a color judging unit to judge whether each of the light metering areas is colored or uncolored, based on the light metering signals, where white is judged to be uncolored, and to produce an output which designates each of the light metering areas as colored or uncolored;

a white-black judging unit, coupled to said color judging unit and said brightness calculation unit, to judge whether each of the plural light metering areas designated as uncolored is white or black based on the corresponding brightness value and the output of said color judging unit and to generate an output; and an exposure calculation unit coupled to said brightness calculation unit, said color judging unit and said white-black judging unit, to determine an exposure value based on the brightness values and the outputs of said color judging unit and said white-black judging unit.

14. A method for determining an exposure value for use in a camera, comprising:

effecting light metering for each of plural light metering areas into which an object field is divided, to produce corresponding light metering signals;

judging, for each of the light metering areas, whether the object in the light metering area is colored or uncolored where white is judged to be uncolored;

judging, for each of the light metering areas designated as uncolored, whether a white or black object is present based on the corresponding light metering signal; and determining an exposure value based on the light metering signals and the results of said judging steps.

* * * * *